US012342383B2

(12) United States Patent
Lei et al.

(10) Patent No.: US 12,342,383 B2
(45) Date of Patent: Jun. 24, 2025

(54) RANDOM-ACCESS OCCASION SELECTION FOR REDUCED-CAPABILITY USER EQUIPMENT

(71) Applicant: QUALCOMM Incorporated, San Diego, CA (US)

(72) Inventors: Jing Lei, San Diego, CA (US); Chao Wei, Beijing (CN); Muhammad Nazmul Islam, Littleton, MA (US); Linhai He, San Diego, CA (US); Yongle Wu, San Diego, CA (US); Chun-Hao Hsu, San Jose, CA (US); Murali Menon, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/685,843

(22) Filed: Mar. 3, 2022

(65) Prior Publication Data
US 2022/0417997 A1    Dec. 29, 2022

Related U.S. Application Data

(63) Continuation of application No. PCT/CN2022/078567, filed on Mar. 1, 2022.

(30) Foreign Application Priority Data

Jun. 25, 2021    (WO) ................ PCT/CN2021/102348

(51) Int. Cl.
*H04W 74/0833*    (2024.01)
*H04L 5/16*    (2006.01)

(52) U.S. Cl.
CPC ........... *H04W 74/0833* (2013.01); *H04L 5/16* (2013.01)

(58) Field of Classification Search
CPC ............................ H04W 74/0833; H04L 5/16
See application file for complete search history.

(56) References Cited

U.S. PATENT DOCUMENTS

2016/0020891 A1*    1/2016    Jung ..................... H04L 5/0064
                                                                        370/280
2016/0028533 A1*    1/2016    Kazmi .............. H04W 56/0045
                                                                        370/296
(Continued)

FOREIGN PATENT DOCUMENTS

CN            112788762 A       5/2021
WO    WO-2011102771 A1 *    8/2011    ............ H04W 72/04
(Continued)

OTHER PUBLICATIONS

International Search Report and Written Opinion—PCT/CN2022/078567—ISA/EPO—May 26, 2022.
(Continued)

*Primary Examiner* — Chuong M Nguyen
(74) *Attorney, Agent, or Firm* — Holland & Hart LLP

(57) ABSTRACT

Methods, systems, and devices for wireless communications are described. The described techniques relate to improved methods, systems, devices, and apparatuses that support random-access occasion (RO) selection for reduced-capability (RedCap) user equipment (UEs). A RedCap UE operating in a half-duplex mode may use the techniques described herein to efficiently select an RO in which to transmit a random-access preamble based on a duration between a latest received downlink transmission and the RO satisfying a threshold duration. The UE may receive system
(Continued)

information mapping a set of synchronization signal blocks (SSBs) to a set of ROs. The UE may then select an RO from the set of ROs in which to transmit the random-access preamble such that the UE has sufficient time to transition from a receive mode to a transmit mode to transmit the random-access preamble.

28 Claims, 16 Drawing Sheets

(56) References Cited

U.S. PATENT DOCUMENTS

| | | | |
|---|---|---|---|
| 2020/0146070 A1* | 5/2020 | Xiong | H04W 56/001 |
| 2020/0267508 A1* | 8/2020 | Fischer | G01S 5/0205 |
| 2020/0267773 A1 | 8/2020 | Islam et al. | |
| 2020/0281018 A1* | 9/2020 | Li | H04W 80/08 |
| 2020/0383141 A1 | 12/2020 | Lei et al. | |
| 2021/0051672 A1* | 2/2021 | Rastegardoost | H04W 74/006 |
| 2021/0068161 A1* | 3/2021 | Takahashi | H04W 74/0833 |
| 2021/0112596 A1* | 4/2021 | Park | H04L 5/005 |
| 2021/0289558 A1* | 9/2021 | Han | H04W 56/001 |
| 2021/0329718 A1* | 10/2021 | Hu | H04W 76/11 |
| 2022/0150018 A1* | 5/2022 | Ko | H04L 5/0055 |
| 2022/0287097 A1* | 9/2022 | Zhang | H04W 74/0833 |
| 2022/0322454 A1* | 10/2022 | Choi | H04W 72/0446 |

FOREIGN PATENT DOCUMENTS

| | | | |
|---|---|---|---|
| WO | WO-2021026710 A1 | 2/2021 | |
| WO | WO-2021231811 A1 * | 11/2021 | H04W 56/001 |

OTHER PUBLICATIONS

LG Electronics: "RACH Procedure", 3GPP Draft, R1-1800355, 3GPP TSG RAN WG1 Meeting AH 1801, RACH Procedure, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, 4 Pages, Jan. 13, 2018 (Jan. 13, 2018), XP051384810, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] paragraph [0002], whole document.
Supplementary European Search Report—EP22827025—Search Authority—The Hague—Apr. 2, 2025.

* cited by examiner

RANDOM-ACCESS OCCASION SELECTION FOR REDUCED-CAPABILITY USER EQUIPMENT

CROSS REFERENCE

The present Application for Patent is a Continuation of Chinese PCT Application No. PCT/CN2022/078567 by LEI et al., entitled "RANDOM-ACCESS OCCASION SELECTION FOR REDUCED-CAPABILITY USER EQUIPMENT," filed Mar. 1, 2022, which claims priority to Chinese PCT Application No. PCT/CN2021/102348 by LEI et al., entitled "RANDOM-ACCESS OCCASION SELECTION FOR REDUCED-CAPABILITY USER EQUIPMENT," filed Jun. 25, 2021, assigned to the assignee hereof, and expressly incorporated by reference in its entirety herein.

FIELD OF TECHNOLOGY

The following relates to wireless communications, including random-access occasion selection for reduced-capability user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may use a random-access procedure to establish or reestablish a connection with a base station. Improved techniques for supporting a random-access procedure between a UE and a base station may be desirable.

SUMMARY

The described techniques relate to improved methods, systems, devices, and apparatuses that support random-access occasion (RO) selection for reduced-capability (RedCap) user equipment (UEs). A RedCap UE operating in a half-duplex mode may use the techniques described herein to efficiently select an RO in which to transmit a random-access preamble based on a duration between a latest received downlink transmission and the RO satisfying a threshold duration. The UE may receive system information mapping a set of synchronization signal blocks (SSBs) to a set of ROs. The UE may then select an RO from the set of ROs in which to transmit the random-access preamble such that the UE has sufficient time to transition from a receive mode to a transmit mode to transmit the random-access preamble. These techniques may allow half-duplex RedCap UEs to efficiently perform random-access procedures to establish or reestablish a connection with a base station.

A method for wireless communication at a UE is described. The method may include receiving system information from a base station indicating a respective mapping of a set of synchronization signal blocks to a set of random-access channel occasions, receiving one or more synchronization signal blocks of the set of synchronization signal blocks from the base station, and transmitting a random-access preamble to the base station in a random-access channel occasion selected from a subset of the set of random-access channel occasions associated with the one or more synchronization signal blocks, the random-access channel occasion selected from the subset of the set of random-access channel occasions based on a duration between a latest received downlink transmission and the random-access channel occasion satisfying a threshold duration.

An apparatus for wireless communication at a UE is described. The apparatus may include a processor, memory coupled with the processor, and instructions stored in the memory. The instructions may be executable by the processor to cause the apparatus to receive system information from a base station indicating a respective mapping of a set of synchronization signal blocks to a set of random-access channel occasions, receive one or more synchronization signal blocks of the set of synchronization signal blocks from the base station, and transmit a random-access preamble to the base station in a random-access channel occasion selected from a subset of the set of random-access channel occasions associated with the one or more synchronization signal blocks, the random-access channel occasion selected from the subset of the set of random-access channel occasions based on a duration between a latest received downlink transmission and the random-access channel occasion satisfying a threshold duration.

Another apparatus for wireless communication at a UE is described. The apparatus may include means for receiving system information from a base station indicating a respective mapping of a set of synchronization signal blocks to a set of random-access channel occasions, means for receiving one or more synchronization signal blocks of the set of synchronization signal blocks from the base station, and means for transmitting a random-access preamble to the base station in a random-access channel occasion selected from a subset of the set of random-access channel occasions associated with the one or more synchronization signal blocks, the random-access channel occasion selected from the subset of the set of random-access channel occasions based on a duration between a latest received downlink transmission and the random-access channel occasion satisfying a threshold duration.

A non-transitory computer-readable medium storing code for wireless communication at a UE is described. The code may include instructions executable by a processor to receive system information from a base station indicating a respective mapping of a set of synchronization signal blocks to a set of random-access channel occasions, receive one or more synchronization signal blocks of the set of synchronization signal blocks from the base station, and transmit a random-access preamble to the base station in a random-access channel occasion selected from a subset of the set of random-access channel occasions associated with the one or more synchronization signal blocks, the random-access channel occasion selected from the subset of the set of random-access channel occasions based on a duration between a latest received downlink transmission and the random-access channel occasion satisfying a threshold duration.

In some examples of the method, apparatuses, and non-transitory computer-readable medium described herein, receiving the system information may include operations, features, means, or instructions for receiving, in the system information, a set of multiple mappings of the set of synchronization signal blocks to different sets of random-access channel occasions and identifying the respective mapping of the set of synchronization signal blocks to the set of random-access channel occasions from the set of multiple mappings based on a capability of the UE, where transmitting the random-access preamble in the random-access channel occasion may be based on the identifying.

Some examples of the method, apparatuses, and non-transitory computer-readable medium described herein may further include operations, features, means, or instructions for identifying the subset of the set of random-access channel occasions from which to select the random-access channel occasion based on a duration between a latest received synchronization signal block of the one or more synchronization signal blocks and each random-access channel occasion in the subset of the set of random-access channel occasions satisfying the threshold duration.

Some examples of the method, apparatuses, and non-transitory computer-readable medium described herein may further include operations, features, means, or instructions for identifying the subset of the set of random-access channel occasions from which to select the random-access channel occasion may be further based on excluding random access occasions of the set of random-access channel occasions that precede a synchronization signal block within a slot. In some examples of the method, apparatuses, and non-transitory computer-readable medium described herein, the UE may be configured to operate in a half-duplex mode, and the latest received downlink transmission includes a control channel transmission, a data channel transmission, or a reference signal transmission.

In some examples of the method, apparatuses, and non-transitory computer-readable medium described herein, receiving the system information may include operations, features, means, or instructions for receiving, in the system information, an indication of the subset of the set of random-access channel occasions from which to select the random-access channel occasion based on a duration between a latest received synchronization signal block of the one or more synchronization signal blocks and each random-access channel occasion in the subset of the set of random-access channel occasions satisfying the threshold duration.

In some examples of the method, apparatuses, and non-transitory computer-readable medium described herein, the threshold duration satisfies a minimum time for the UE to transition from a receive mode to a transmit mode. In some examples of the method, apparatuses, and non-transitory computer-readable medium described herein, the UE may be configured to utilize frequency division duplexing, and the minimum time for the UE to transition from the receive mode to the transmit mode may be based on a numerology used for the random-access preamble, a capability of the UE, or both. In some examples of the method, apparatuses, and non-transitory computer-readable medium described herein, the UE may be configured to utilize time division duplexing, and the minimum time for the UE to transition from the receive mode to the transmit mode may be based on a numerology used for the random-access preamble, a capability of the UE, a radio frequency retuning time at the UE, or a combination thereof.

In some examples of the method, apparatuses, and non-transitory computer-readable medium described herein, the threshold duration may be equal to a duration configured at the UE for switching from a receive mode to a transmit mode in a time division duplexing mode. Some examples of the method, apparatuses, and non-transitory computer-readable medium described herein may further include operations, features, means, or instructions for receiving an indication of the threshold duration from the base station based on a capability of the UE, where the random-access channel occasion may be selected based on receiving the indication of the threshold duration.

Some examples of the method, apparatuses, and non-transitory computer-readable medium described herein may further include operations, features, means, or instructions for selecting the random-access channel occasion in which to transmit the random-access preamble based on a reference signal received power measurement of a synchronization signal block of the one or more synchronization signal blocks satisfying a threshold. In some examples of the method, apparatuses, and non-transitory computer-readable medium described herein, the UE includes a reduced-capability UE.

A method for wireless communication at a base station is described. The method may include transmitting system information to a set of multiple UEs indicating a first mapping of a set of synchronization signal blocks to a first set of random-access channel occasions and a second mapping of the set of synchronization signal blocks to a second set of random-access channel occasions, transmitting the set of synchronization signal blocks, and receiving, from a UE of the set of multiple UEs in response to transmitting the set of synchronization signal blocks, a random-access preamble in a random-access channel occasion selected from the first set of random-access channel occasions in accordance with the first mapping.

An apparatus for wireless communication at a base station is described. The apparatus may include a processor, memory coupled with the processor, and instructions stored in the memory. The instructions may be executable by the processor to cause the apparatus to transmit system information to a set of multiple UEs indicating a first mapping of a set of synchronization signal blocks to a first set of random-access channel occasions and a second mapping of the set of synchronization signal blocks to a second set of random-access channel occasions, transmit the set of synchronization signal blocks, and receive, from a UE of the set of multiple UEs in response to transmitting the set of synchronization signal blocks, a random-access preamble in a random-access channel occasion selected from the first set of random-access channel occasions in accordance with the first mapping.

Another apparatus for wireless communication at a base station is described. The apparatus may include means for transmitting system information to a set of multiple UEs indicating a first mapping of a set of synchronization signal blocks to a first set of random-access channel occasions and a second mapping of the set of synchronization signal blocks to a second set of random-access channel occasions, means for transmitting the set of synchronization signal blocks, and means for receiving, from a UE of the set of multiple UEs in response to transmitting the set of synchronization signal blocks, a random-access preamble in a random-access channel occasion selected from the first set of random-access channel occasions in accordance with the first mapping.

A non-transitory computer-readable medium storing code for wireless communication at a base station is described. The code may include instructions executable by a processor to transmit system information to a set of multiple UEs indicating a first mapping of a set of synchronization signal blocks to a first set of random-access channel occasions and a second mapping of the set of synchronization signal blocks to a second set of random-access channel occasions, transmit the set of synchronization signal blocks, and receive, from a UE of the set of multiple UEs in response to transmitting the set of synchronization signal blocks, a random-access preamble in a random-access channel occasion selected from the first set of random-access channel occasions in accordance with the first mapping.

Some examples of the method, apparatuses, and non-transitory computer-readable medium described herein may further include operations, features, means, or instructions for identifying the first set of random-access channel occasions from which the UE may be to select the random-access channel occasion based on a duration between a latest transmitted synchronization signal block of the set of synchronization signal blocks and each random-access channel occasion in the first set of random-access channel occasions satisfying a threshold duration.

In some examples of the method, apparatuses, and non-transitory computer-readable medium described herein, the threshold duration satisfies a minimum time for the UE to transition from a receive mode to a transmit mode. In some examples of the method, apparatuses, and non-transitory computer-readable medium described herein, the UE may be configured to utilize frequency division duplexing, and the minimum time for the UE to transition from the receive mode to the transmit mode may be based on a numerology used for the random-access preamble, a capability of the UE, or both.

In some examples of the method, apparatuses, and non-transitory computer-readable medium described herein, the UE may be configured to utilize time division duplexing, and the minimum time for the UE to transition from the receive mode to the transmit mode may be based on a numerology used for the random-access preamble, a capability of the UE, a radio frequency retuning time at the UE, or a combination thereof. Some examples of the method, apparatuses, and non-transitory computer-readable medium described herein may further include operations, features, means, or instructions for identifying the first set of random-access channel occasions from which the UE may be to select the random-access channel occasion may be further based on excluding random access occasions that precede a synchronization signal block within a slot.

In some examples of the method, apparatuses, and non-transitory computer-readable medium described herein, the threshold duration may be equal to a duration configured at the UE for switching from a receive mode to a transmit mode in a time division duplexing mode. Some examples of the method, apparatuses, and non-transitory computer-readable medium described herein may further include operations, features, means, or instructions for transmitting an indication of the threshold duration to the UE based on a capability of the UE, where receiving the random-access preamble in the random-access channel occasion may be based on transmitting the indication of the threshold duration.

In some examples of the method, apparatuses, and non-transitory computer-readable medium described herein, receiving the random-access preamble may include operations, features, means, or instructions for receiving the random-access preamble in the random-access channel occasion based on a reference signal received power measurement of a synchronization signal block in the set of synchronization signal blocks satisfying a threshold. In some examples of the method, apparatuses, and non-transitory computer-readable medium described herein, the UE includes a reduced-capability UE.

DETAILED DESCRIPTION

In some wireless communications systems, a user equipment (UE) may use a random-access procedure to establish or reestablish a connection with a base station. As part of the random-access procedure, the UE may transmit a random-access preamble to the base station in response to a synchronization signal block (SSB) received from the base station. The base station may transmit a set of SSBs over different beams. The UE may select the SSB from the set of SSBs if, for example, a measurement (e.g., reference signal received power (RSRP)) performed on the SSB satisfies a threshold (e.g., RSRP threshold). Because the UE may receive each SSB on a different beam, the selection of the SSB may correspond to selecting a beam for communications with the base station. In some cases, however, an RO paired with a selected SSB may quickly follow the SSB received by the UE. Additionally, or alternatively, the UE may receive another downlink transmission shortly before the RO. As a result, the UE may not have sufficient time to transition to a transmit mode to transmit a random-access preamble in the RO in response to the selected SSB, and the random-access procedure at the UE may be delayed.

As described herein, a wireless communications system may support efficient techniques for facilitating a random-access procedure between a UE and a base station. In particular, a RedCap UE operating in a half-duplex mode may use the techniques described herein to efficiently select an RO in which to transmit a random-access preamble based on a duration between a latest received downlink transmission and the RO satisfying a threshold duration. The UE may receive system information mapping a set of synchronization signal blocks (SSBs) to a set of ROs. The UE may then select an RO from the set of ROs in which to transmit the random-access preamble such that the UE has sufficient time to transition from a receive mode to a transmit mode to transmit the random-access preamble. These techniques may allow half-duplex RedCap UEs to efficiently perform random-access procedures to establish or reestablish a connection with a base station.

Aspects of the disclosure are initially described in the context of wireless communications systems. Examples of processes and signaling exchanges that support RO selection for RedCap UEs are then described. Aspects of the disclosure are further illustrated by and described with reference to apparatus diagrams, system diagrams, and flowcharts that relate to RO selection for RedCap UEs.

Figure 1:
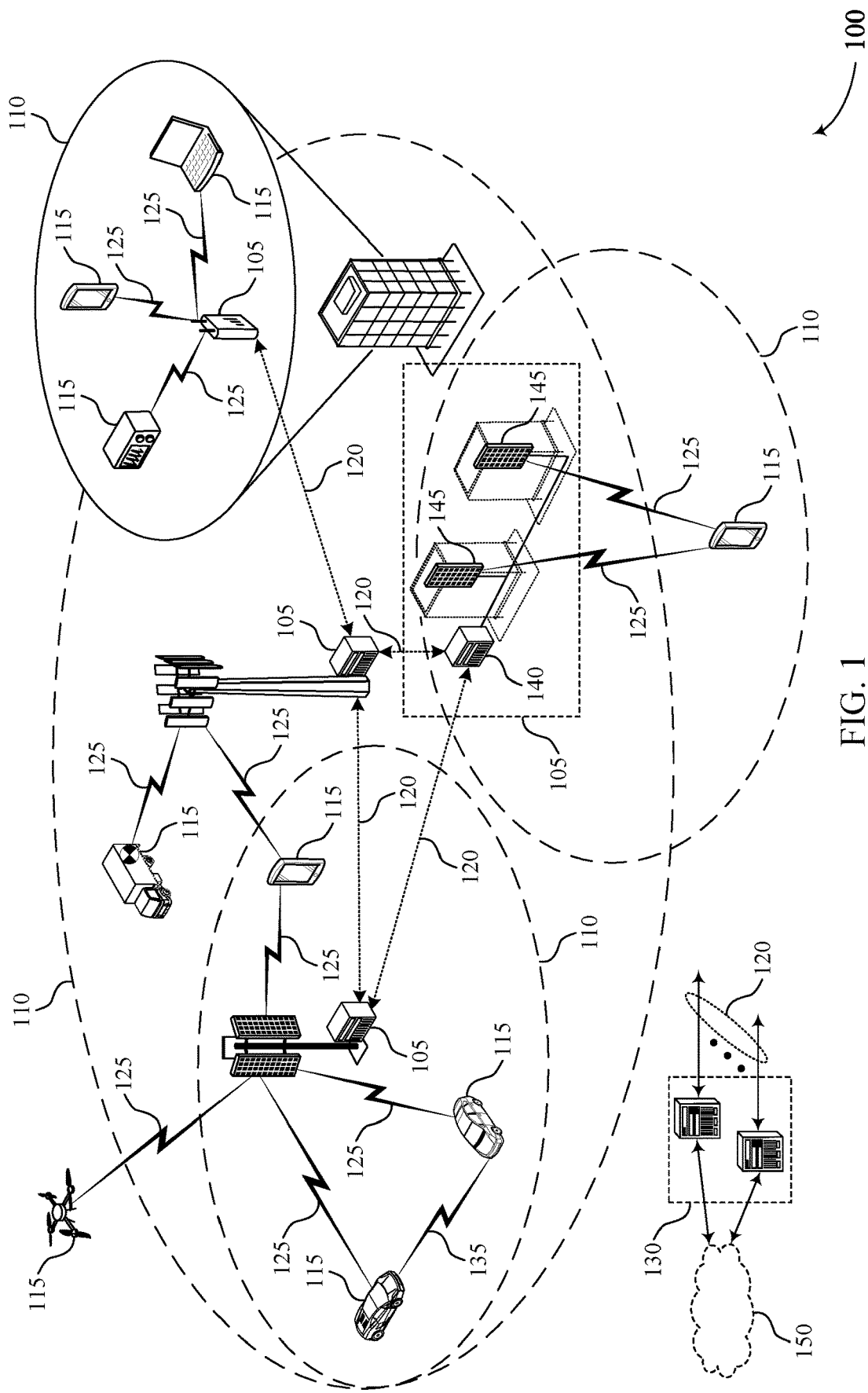
FIG. 1 illustrates an example of a wireless communications system that supports random-access occasion (RO) selection for reduced-capability (RedCap) user equipment (UEs) in accordance with aspects of the present disclosure.

FIG. 1 illustrates an example of a wireless communications system 100 that supports RO selection for RedCap UEs in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex (HD) communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

In some cases, a UE 115 may support type-A half-duplex operation (e.g., a first type of half-duplex operation), type-B half-duplex operation (e.g., a second type of half-duplex operation), or both. For type-A half-duplex, a UE 115 may be configured with a guard period between downlink and uplink (e.g., when downlink switches to uplink). For type-B half-duplex, a UE 115 may be configured with a guard period between downlink and uplink (e.g., when downlink switches to uplink) and another guard period between uplink and downlink (e.g., when uplink switches to downlink).

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or fifth generation (5G) core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Figure 2:
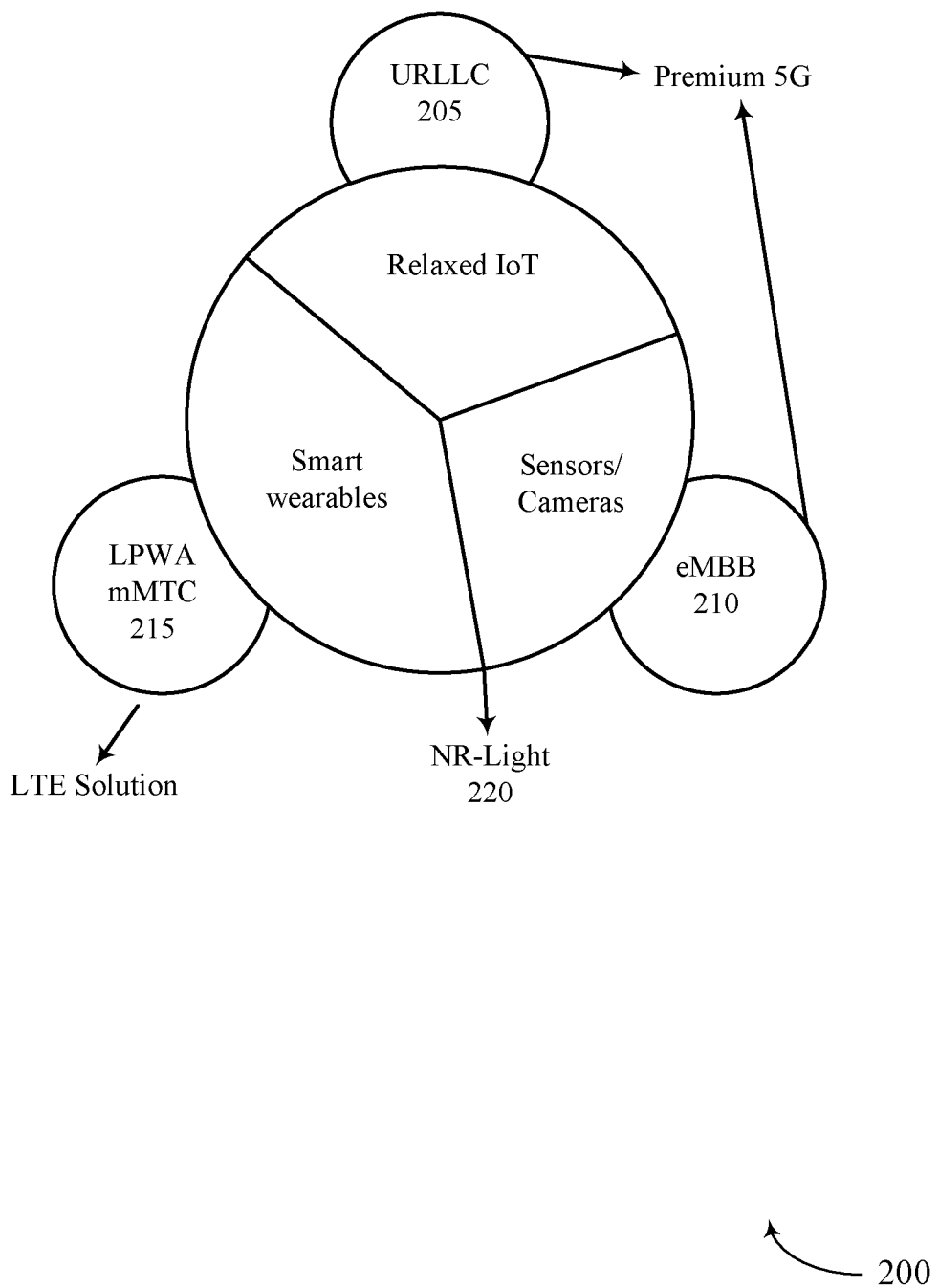
FIG. 2 illustrates an example of different categories of UEs in accordance with aspects of the present disclosure.

In wireless communications system 100, UEs 115 may be categorized based on the capabilities of the UEs 115. FIG. 2 illustrates an example of different categories 200 of UEs in accordance with aspects of the present disclosure. Some UEs 115 may be categorized as URLLC UEs 205, and some UEs 115 may be categorized as enhanced mobile broadband (eMBB) UEs 210 (e.g., premium smartphones). The URLLC UEs 205 and the eMBB UEs 210 may support communications in 5G (e.g., premium 5G) or NR networks. Some other UEs 115 may be categorized as low power wide area (LPWA) massive MTC (mMTC) UEs 215. The LPWA mMTC UEs 215 may support communications in LTE networks. In addition to these UEs 115, some other UEs 115 in wireless communications system 100 may be categorized as NR-light UEs 220.

In some aspects, it may be appropriate from some networks (e.g., NR networks) to be scalable and deployable in a more efficient and cost-effective way. For instance, these networks may achieve peak throughput and minimal latency, while reliability requirements may be relaxed. Further, these networks may improve efficiency (e.g., power consumption and system overhead) and improve cost. As such, these networks may support UEs 115 categorized as NR-light UEs 220. NR-light UEs 220 may be referred to as RedCap UEs 115. RedCap UEs 115 may include wearables, industrial wireless sensor networks (IWSNs), surveillance cameras, and low-end smartphones. Further, RedCap UEs 115 may operate on large frequency bands (e.g., 20 MHz or up to 100 MHz), whereas other UEs, such as NB-IoT UEs and eMTC UEs may operate on a narrowband (e.g., one resource block or six resource blocks).

In addition, RedCap UEs 115 may support low spectral efficiency and scalable numerology as well as communications using time division duplexing (TDD) and frequency division duplexing (FDD) in a full-duplex (FD) or half-duplex (HD) mode. When using FDD, a RedCap UE 115 may communicate with a base station 105 on a paired spectrum. The paired spectrum may include a first frequency band for uplink communications and a second frequency band for downlink communications. When using TDD, the RedCap UE 115 may communicate with the base station 105 on an unpaired spectrum. That is, the RedCap UE 115 may transmit on the uplink and receive on the downlink on the same carrier.

Figure 3:
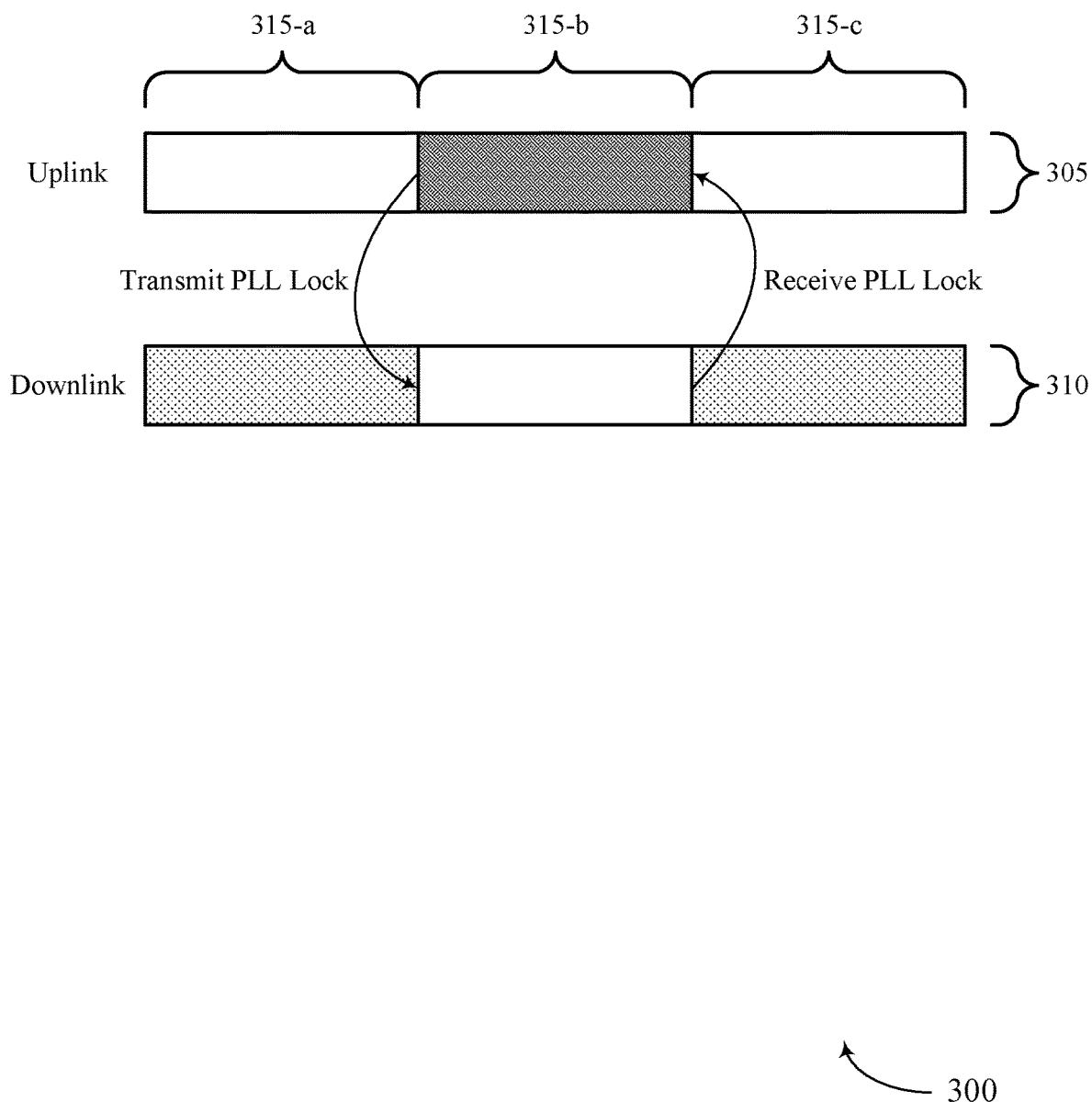
FIG. 3 illustrates an example of half-duplex (HD) frequency division duplexing (FDD) in accordance with aspects of the present disclosure.

FIG. 3 illustrates an example of half-duplex frequency division duplexing (FDD) 300 in accordance with aspects of the present disclosure. Because some RedCap UEs 115 may operate in a half-duplex mode, these UEs 115 may achieve cost reduction, power savings, lower noise figures, and insertion losses. In some cases, the cost reduction may be achieved by replacing a duplexer in a half-duplex UE 115 with a switch. The switch may reduce cost as compared with the duplexer, and because a UE may have multiple duplexers to support full-duplex over different bands the cost saving gain may scale up with multi-band support. Further, power savings may be achieved by sequential toggling of transmit phase locked loops (PLLs) and receive PLLs since a transceiver chain at a half-duplex UE 115 may be in a low-power state when communications is going in an opposite direction.

In FIG. 3, a half-duplex UE 115 may transmit on the uplink on a first carrier 305 and receive on the downlink on a second carrier 310. For example, the half-duplex UE 115 may transmit on the uplink on the first carrier 305 in a first time period 315-a, receive on the downlink on the second carrier 310 in a second time period 315-b, and transmit on the uplink on the first carrier 305 in the third time period 315-c. When transitioning from transmitting on the uplink to receiving on the downlink, the half-duplex UE 115 may lock a transmit PLL. Similarly, when transitioning from receiving on the downlink to transmitting on the uplink, the half-duplex UE 115 may lock a receive PLL. By supporting FDD in a half-duplex mode, the half-duplex UE 115 may achieve lower latency and higher throughput in addition to more flexible downlink and uplink switching positions.

In some aspects, in addition or as an alternative to FDD, a half-duplex UE 115 may communicate with a base station 105 using TDD. In such aspects, the half-duplex UE 115 may be configured with a slot format indicating which slots are to be used for uplink, which slots are to be used for downlink, and which slots are flexible. When a TDD slot includes downlink and uplink symbols, flexible symbols may be configured between downlink and uplink symbols (e.g., when downlink switches to uplink), and there may be at least one flexible symbol between downlink and uplink symbols (e.g., a minimum number of flexible symbols may be equal to one). Further, flexible symbols may not be configured between uplink and downlink symbols (e.g., when uplink switches to downlink).

Figure 4:
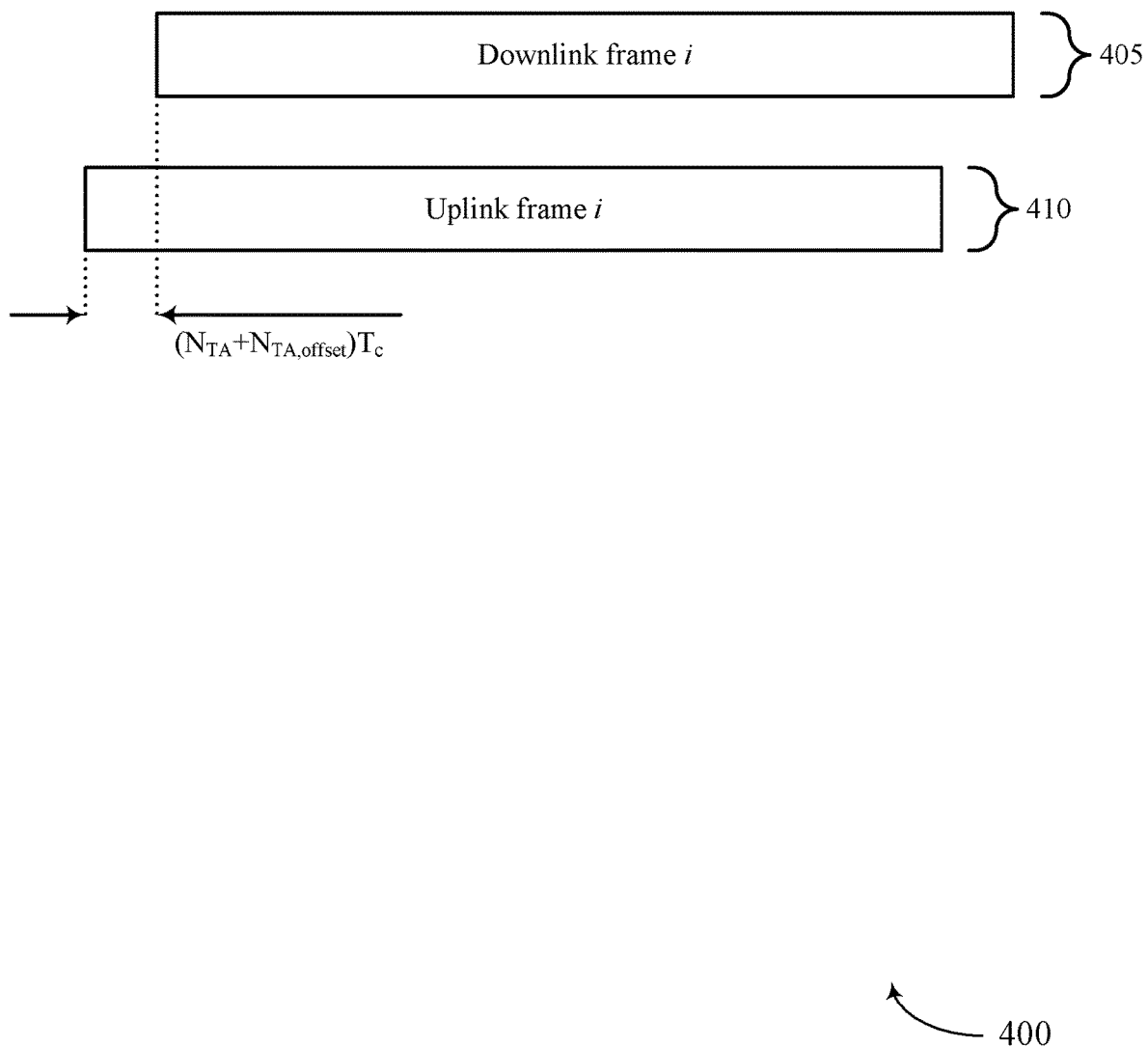
FIG. 4 illustrates an example of a timing advance in time division duplexing (TDD) in accordance with aspects of the present disclosure.

Because a UE 115 may transmit uplink signals using a timing advance, and downlink signals may take some time to arrive at the UE 115, the flexible symbols may be configured when downlink switches to uplink and not when uplink switches to downlink. FIG. 4 illustrates an example of a timing advance 400 in time division duplexing (TDD) in accordance with aspects of the present disclosure. A UE 115 may transmit an uplink frame 410 to a base station in advance of a downlink frame 405 such that the uplink frame 410 aligns with the downlink frame 405 at the base station 105. In FIG. 4, a base station 105 may indicate a value of $N_{TA}$ to the UE 115 and a value of $N_{TA,offset}$ may vary. Further, $T_c$ may refer to a basic time unit in a wireless communications system.

Tables 1, 2, and 3 below show the peak data rates in different duplex modes. For a RedCap UE 115 with one transmitter and one receiver (1T1R), the RedCap UE 115 may use a maximum modulation order of 64 quadrature amplitude modulation (QAM) and a maximum code rate of 948/1024, and the RedCap UE 115 may achieve a downlink overhead of 0.14 and an uplink overhead of 0.08. In NR TDD, a RedCap UE 115 may be configured with a DDSU slot format, where a 'D' corresponds to a downlink symbol, an 'S' corresponds to a special symbol, and a 'U' corresponds to an uplink symbol (e.g., format 28 with one 'S' symbol, $n_f=1$). In NR Type-A HD-FDD, a RedCap UE 115 may be configured with a switching gap between downlink and uplink (e.g., when downlink switches to uplink), and the switching gap may be based on a subcarrier spacing (SCS). For an SCS of 15 kHz with $n_g=1$, a RedCap UE 115 may experience no loss with respect to format 28, and for an SCS of 30 kHz with $n_g=2$, a RedCap UE 115 may experience a 3% loss with respect to format 28. The RedCap UE 115 may also be configured with a DDSU slot format, such as format 28 with a number of guard symbols, $n_g=1$ or format 29 with $n_g=2$. Thus, there may be similar latency and throughput for TDD and FDD.

TABLE 1

FD-FDD

| BW (MHz) | SCS (kHz) | Peak Data Rate (Mbps) ||
| | | DL | UL |
| --- | --- | --- | --- |
| 20 | 15 | 85.0 | 91.0 |
| 20 | 30 | 81.8 | 87.5 |

TABLE 2

TDD, DDSU, Format 28 for S Slot, $n_f = 1$

| BW (MHz) | SCS (kHz) | Peak Data Rate (Mbps) ||
| | | DL | UL |
| --- | --- | --- | --- |
| 20 | 15 | 60.2 | 22.7 |
| 20 | 30 | 57.9 | 21.8 |

TABLE 3

Type-A HD-FDD, DDSU, TDD Slot Formats 28 and 29 for S Slot, $n_g = 1$ or 2

| BW (MHz) | SCS (kHz) | $n_g$ | Peak Data Rate (Mbps) ||
| | | | DL | UL |
| --- | --- | --- | --- | --- |
| 20 | 15 | 1 | 60.2 | 22.7 |
| 20 | 30 | 1 | 57.9 | 21.8 |
| 20 | 30 | 2 | 56.2 | 21.8 |

In wireless communications system 100, a UE 115 may use a random-access procedure to establish or reestablish a connection with a base station 105. As part of the random-access procedure, the UE may transmit a random-access preamble to the base station in response to an SSB received from the base station. The base station 105 may transmit a set of SSBs associated with different beams. The UE may select the SSB from the set of SSBs if, for example, a measurement (e.g., RSRP) performed on the SSB satisfies a threshold (e.g., RSRP threshold). Because the UE may receive each SSB on a different beam, the selection of the SSB may correspond to selecting a beam for communications with the base station. In some cases, however, an RO paired with a selected SSB may quickly follow the SSB received by the UE. Additionally, or alternatively, the UE may receive another downlink transmission shortly before the RO. As a result, the UE may not have sufficient time to transition to a transmit mode to transmit a random-access preamble in the RO in response to the selected SSB, and the random-access procedure at the UE may be delayed. Wireless communications system 100 may support efficient techniques for facilitating a random-access procedure between a UE 115 and a base station 105.

Figure 5:
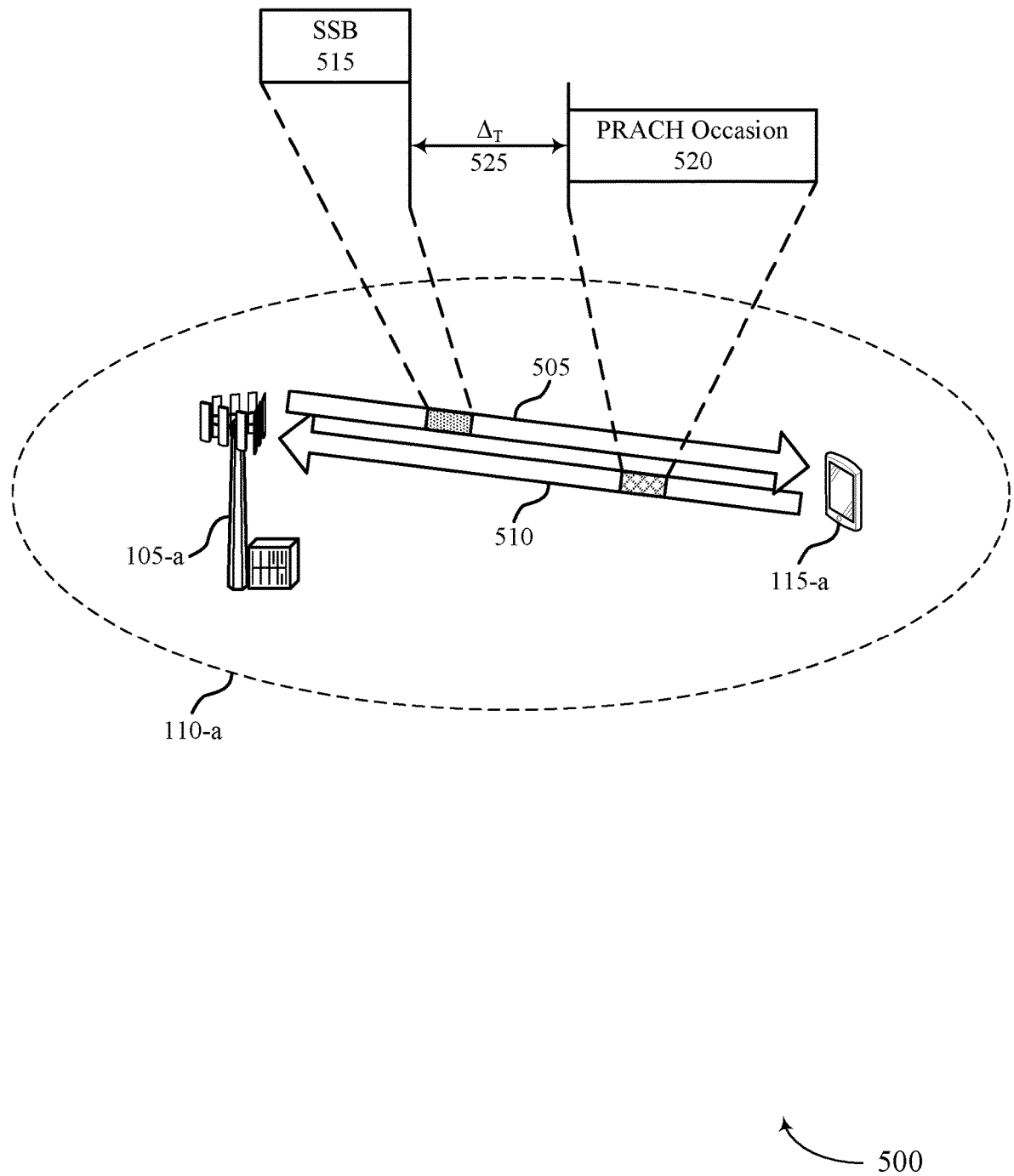
FIG. 5 illustrates an example of a wireless communications system that supports RO selection for RedCap UEs in accordance with aspects of the present disclosure.

FIG. 5 illustrates an example of a wireless communications system 500 that supports RO selection for RedCap UEs in accordance with aspects of the present disclosure. The wireless communications system 500 includes a UE 115-a, which may be an example of a UE 115 described with reference to FIG. 1. For instance, UE 115-a may be an example of a RedCap UE 115 described with reference to FIGS. 1-5. The wireless communications system 500 also includes a base station 105-a, which may be an example of a base station 105 described with reference to FIG. 1. The UE 115-a may communicate with the base station 105-a on resources of a carrier 505 and a carrier 510 (e.g., which may correspond to different or the same carriers). The wireless communications system 500 may implement aspects of the wireless communications system 100. For example, the wireless communications system 500 may support efficient techniques for facilitating a random-access procedure between the UE 115-a and the base station 105-a.

In the example of FIG. 5, the base station 105-a may transmit system information or radio resource control (RRC) signaling to the UE 115-a indicating configurations for communicating with the UE 115-a. The UE 115-a may then decode the system information or RRC signaling to obtain an uplink bandwidth part (BWP) for transmitting to the base station 105-a and random-access channel (RACH) configurations for the UE 115-a. The RACH configurations may include physical RACH (PRACH) resource, mapping patterns, parameters for RO validation, one or more RO selection rules, and power control parameters. The mapping patterns may be referred to as SSB to PRACH mapping patterns or SSB-to-RO mappings and may map a set of SSBs to one or more sets of ROs in which the UE 115-a may transmit random-access preambles.

The base station 105-a may indicate SSB to PRACH mapping patterns separately for RedCap UEs 115 (e.g., such as UE 115-a) and non-RedCap UEs 115. For instance, the base station 105-a may include different parameters in system information (e.g., ssb-perRACH-OccasionAndCB-PreamblesPerSSB, ra-ssb-OccasionMaskIndex, etc.) for RedCap UEs 115 and non-RedCap UEs 115. Alternatively, the base station 105-b may indicate a common SSB-to-RO mapping pattern for RedCap UEs 115 and non-RedCap UEs 115. In some cases, by configuration, the base station 105-a may ensure that the PRACH resources allocated for RedCap UEs 115 (e.g., half-duplex and full-duplex RedCap UEs) may be mapped to all SSBs indicated in system information (e.g., by ssb-PositionsInBurst in a system information block one (SIB1) or in ServingCellConfigCommon) within an SSB-to-RO association pattern period (e.g., assuming a RedCap UE 115 is not capable of full-duplex operation). Further, in some cases, the SSB-to-RO association pattern period for RedCap UEs 115 and non-RedCap UEs may be configured by the base station 105-a (e.g., the network) to be the same or different.

After the UE 115-a identifies the respective SSB-to-RO mapping (e.g., the SSB-to-RO mapping for RedCap UEs 115), it may be appropriate for the UE 115-a to validate the ROs in the SSB-to-RO mapping (e.g., depending on duplex mode, parameters for RO validation, and UE capability). Alternatively, the base station 105-a may validate ROs in the SSB-to-RO mapping before transmitting the SSB-to-RO mapping to the UE 115-a, and the UE 115-a may assume that all allocated ROs are valid. In any case, it may be appropriate for valid ROs of a RedCap UE 115 to meet certain conditions. For instance, a valid RO may not precede an SSB (e.g., a synchronization signal or physical broadcast channel (PBCH) block) within a slot (e.g., a PRACH slot). Further, a valid RO may start at least a threshold duration after a last symbol in which an SSB is received (e.g., a last SSB reception symbol).

In FIG. 5, the base station 105-a may transmit an SSB 515 to the UE 115-a, and the RO 520 may be valid for transmitting a random-access preamble (e.g., PRACH preamble) if the RO 520 follows the SSB 515 by the threshold duration. That is, the RO 520 may be valid if the gap 525 between the SSB 515 and the RO 520 is greater than or equal to the threshold duration. The threshold duration may correspond to a set of symbols denoted as $N_{gap,RC}$ symbols. If the UE 115-a is performing a RACH procedure using FDD (e.g., on a paired spectrum), $N_{gap,RC}$ may depend on the numerology of the PRACH preamble and a UE capability (e.g., capability of the UE 115-a). If the UE 115-a is performing a RACH procedure using TDD (e.g., on an unpaired spectrum), $N_{gap,RC}$ may depend on the numerology of the PRACH preamble, a UE capability (e.g., capability of the UE 115-a), and a radio frequency retuning time at the UE 115-a (e.g., when a center frequency of a downlink and uplink BWP pair is not aligned).

In one aspect, the threshold duration may be greater than a minimum receive-to-transmit (RX-to-TX) switching time for half-duplex FDD. That is, $T_{symbol}N_{gap,RC}$ may be greater than the minimum RX-to-TX switching time (e.g., in TDD), where $T_{symbol}$ represents a duration of a symbol and is based on a reference SCS of a PRACH slot. In this aspect, the base station 105-a may signal $N_{gap,RC}$ to the UE 115-a (e.g., $N_{gap,RC}$ may be specified by a look-up table (LUT), or may be signaled in system information (e.g., SIB1), or both). In another aspect, the threshold duration may be equal to a duration configured at the UE 115-a for RX-to-TX switching (e.g., $N_{gap,RC}=N_{gap}$ or $N_{flexible}$ of TDD).

Once the ROs in the SSB-to-RO mapping are validated, the UE 115-a may select the RO 520 in which to transmit a RACH preamble to the base station 105-a in response to the SSB 515. That is, the UE 115-a may select the RO 520 from the valid ROs. Further, the UE 115-a may perform RO selection depending on synchronization signal (SS) RSRP (SS-RSRP) measurements and power class and antenna efficiencies of the UE 115-a. The UE 115-a may also perform priority or collision handling for a PRACH transmission (e.g., with RO reselection or cancellation if a collision happens). After selecting the RO 520, the UE 115-a may transmit a RACH preamble to the base station 105-a on the RO 520 (e.g., a power controlled PRACH transmission in an uplink BWP allocated to the UE 115-a). In some cases, half-duplex and full-duplex RedCap UEs 115 may follow the same or different rules in selecting the RO from the valid ROs in which to transmit the RACH preamble (e.g., for direction collision handling).

In one aspect, half-duplex and full-duplex RedCap UEs 115 may follow different rules in selecting the RO 520. In this aspect, a half-duplex RedCap UE 115 may transmit a RACH preamble on a valid RO if the RO is at least $N_{gap,RC}$ symbols after a last downlink symbol (e.g., including a PDCCH, PDSCH, channel state information reference signal (CSI-RS), tracking reference signal (TRS), or positioning reference signal (PRS)). Further, the half-duplex RedCap UE 115 may transmit the RACH preamble on a valid RO if a reference signal received power (RSRP) of an SSB preceding the RO is above a threshold ($\gamma_1$) preconfigured by the base station 105-a (e.g., the network), where the threshold ($\gamma_1$) is a function of a power class, antenna efficiency, and other capabilities of the UE 115-a. Alternatively, a full-duplex UE 115 may transmit the RACH preamble on a valid RO if an RSRP of an SSB preceding the RO is above a threshold ($\gamma_2$) preconfigured by the base station 105-a (e.g., the network), where the threshold ($\gamma_2$) is a function of a power class, antenna efficiency, and other capabilities of the UE 115-a.

In another aspect, half-duplex and full-duplex RedCap UEs 115 may follow the same rules in selecting the RO 520. In this aspect, a half-duplex or full-duplex RedCap UE 115 may transmit a RACH preamble on a valid RO if the RO is at least $N_{gap,RC}$ symbols after a last downlink symbol (e.g., including a PDCCH, PDSCH, channel state information reference signal (CSI-RS), tracking reference signal (TRS), or positioning reference signal (PRS)). Further, the half-duplex or full-duplex RedCap UE 115 may transmit the RACH preamble on a valid RO if an RSRP of an SSB preceding the RO is above a threshold ($\gamma_1$) preconfigured by the base station 105-*a* (e.g., the network), where the threshold ($\gamma_1$) is a function of a power class, antenna efficiency, and other capabilities of the UE 115-*a*.

Figure 6:
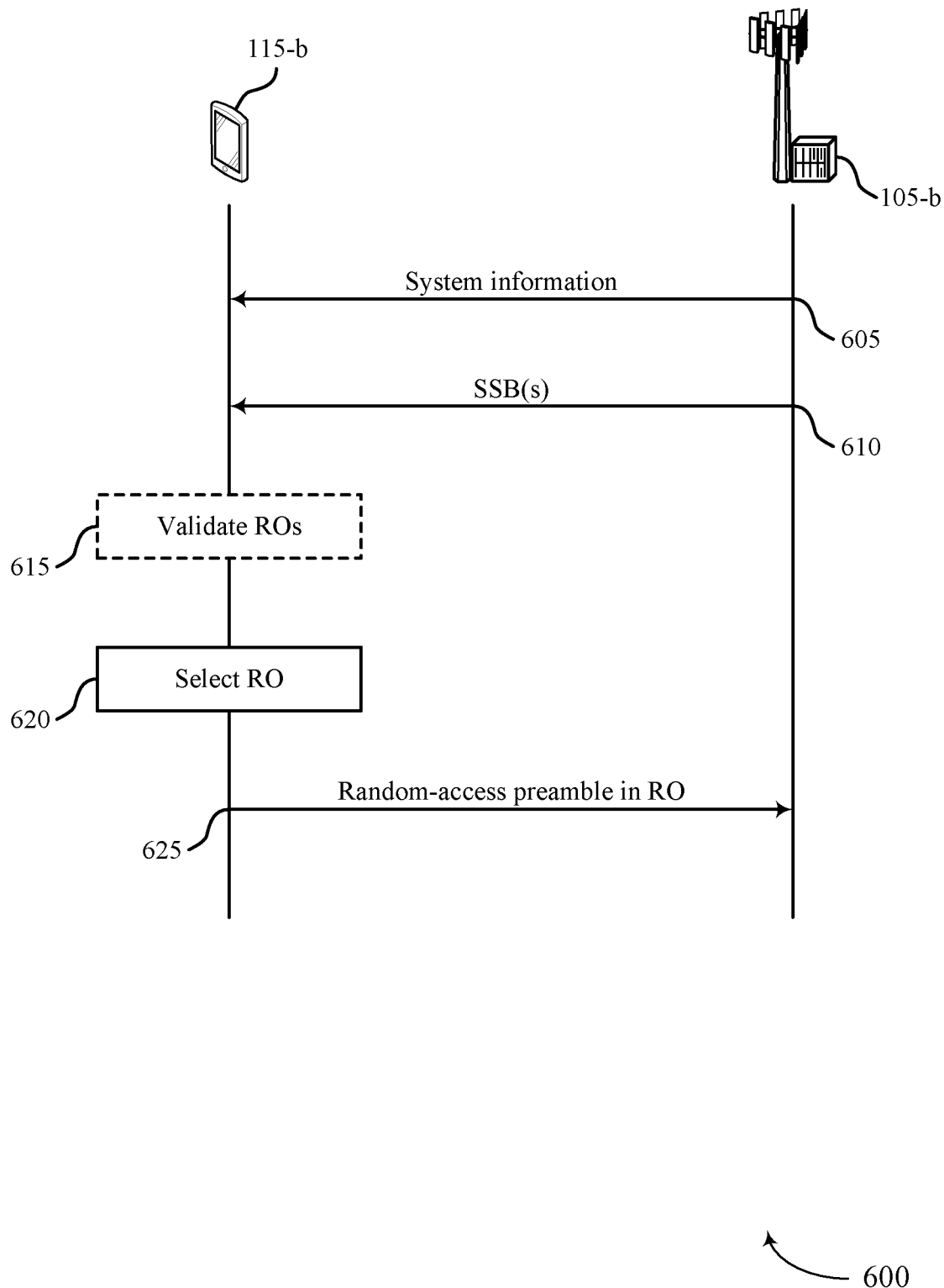
FIG. 6 illustrates an example of a process flow that supports RO selection for RedCap UEs in accordance with aspects of the present disclosure.

FIG. 6 illustrates an example of a process flow 600 that supports RO selection for RedCap UEs in accordance with aspects of the present disclosure. Process flow 600 includes a UE 115-*b*, which may be an example of a UE 115 described with reference to FIGS. 1-5. For instance, UE 115-*b* may be an example of a RedCap UE 115 described with reference to FIGS. 1-5. Process flow 600 also includes a base station 105-*b*, which may be an example of a base station 105 described with reference to FIGS. 1-5. The process flow 600 may implement aspects of wireless communications system 200. For example, the process flow 600 may support efficient techniques for facilitating a random-access procedure between a UE 115 and a base station 105.

In the following description of the process flow 600, the signaling exchanged between the UE 115-*b* and the base station 105-*b* may be exchanged in a different order than the example order shown, or the operations performed by the UE 115-*b* and the base station 105-*b* may be performed in different orders or at different times. Some operations may also be omitted from the process flow 600, and other operations may be added to the process flow 600.

At 605, the base station 105-*b* may transmit, and the UE 115-*b* may receive, system information indicating a first mapping of a set of SSBs to a first set of ROs (e.g., an SSB-to-RO mapping for RedCap UEs) and a second mapping of the set of SSBs to a second set of ROs (e.g., an SSB-to-RO mapping for other UEs). The UE 115-*b* may then identify the first mapping of the set of SSBs to the first set of ROs (e.g., a respective mapping intended for the UE 115-*b*) based on a capability of the UE 115-*b*. For instance, the system information may include a header identifying the SSB-to-RO mapping for RedCap UEs, and the UE 115-*b* may decode the header and identify the SSB-to-RO mapping for RedCap UEs. Alternatively, UE 115-*b* may identify the SSB-to-RO mapping for RedCap UEs based on a location of the mapping within the system information. At 610, the base station 105-*b* may transmit the set of SSBs, and the UE 115-*b* may receive one or more SSBs of the set of SSBs.

In some cases, at 615, the UE 115-*b* may identify a subset of the set of ROs from which to select an RO based on a duration between a latest received SSB of the one or more SSBs and each RO in the subset of the set of ROs satisfying a threshold duration. Further, the UE 115-*b* may identify the subset of the set of ROs from which to select the RO based on excluding ROs of the set of ROs that precede an SSB within a slot. That is, the UE 115-*b* may validate the subset of the set of ROs. In other cases, the base station 105-*b* may identify the subset of the set of ROs from which the UE 115-*b* is to select the RO based on a duration between a latest transmitted SSB of the set of SSBs and each RO in the first set of ROs satisfying a threshold duration. That is, the base station 105-*b* may validate the ROs. The base station 105-*b* may then transmit, and the UE 115-*b* may receive, in the system information, an indication of the subset of the set of ROs from which to select the RO (e.g., the SSB-to-RO mapping may map the set of SSBs to valid ROs).

At 620, the UE 115-*b* may select an RO in which to transmit a random-access preamble based on an RSRP of an SSB of the one or more SSBs satisfying a threshold. The UE 115-*b* may also select the RO based on a duration between a latest received downlink transmission and the RO satisfying a threshold duration. In some cases, the UE 115-*b* may be configured to operate in a half-duplex mode, and the latest received downlink transmission may include a control channel transmission, a data channel transmission, or a reference signal transmission. At 625, the UE 115-*b* may then transmit, and the base station 105-*b* may receive, a random-access preamble in the RO selected from the subset of the set of ROs associated with the one or more SSBs (i.e., the RO selected at 620).

In some cases, the base station 105-*b* may transmit, and the UE 115-*b* may receive, an indication of the threshold duration based on a capability of the UE 115-*b*. In one aspect, the threshold duration may be equal to a duration configured at the UE 115-*b* for switching from a receive mode to a transmit mode in a TDD mode. In another aspect, the threshold duration may satisfy a minimum time for the UE 115-*b* to transition from a receive mode to a transmit mode. If the UE 115-*b* is configured to use FDD, the minimum time for the UE 115-*b* to transition from the receive mode to the transmit mode may be based on a numerology used for the random-access preamble, a capability of the UE 115-*b*, or both. If the UE 115-*b* is configured to use TDD, the minimum time for the UE 115-*b* to transition from the receive mode to the transmit mode may be based on a numerology used for the random-access preamble, a capability of the UE 115-*b*, a radio frequency retuning time at the UE 115-*b*, or a combination thereof.

Figure 7:
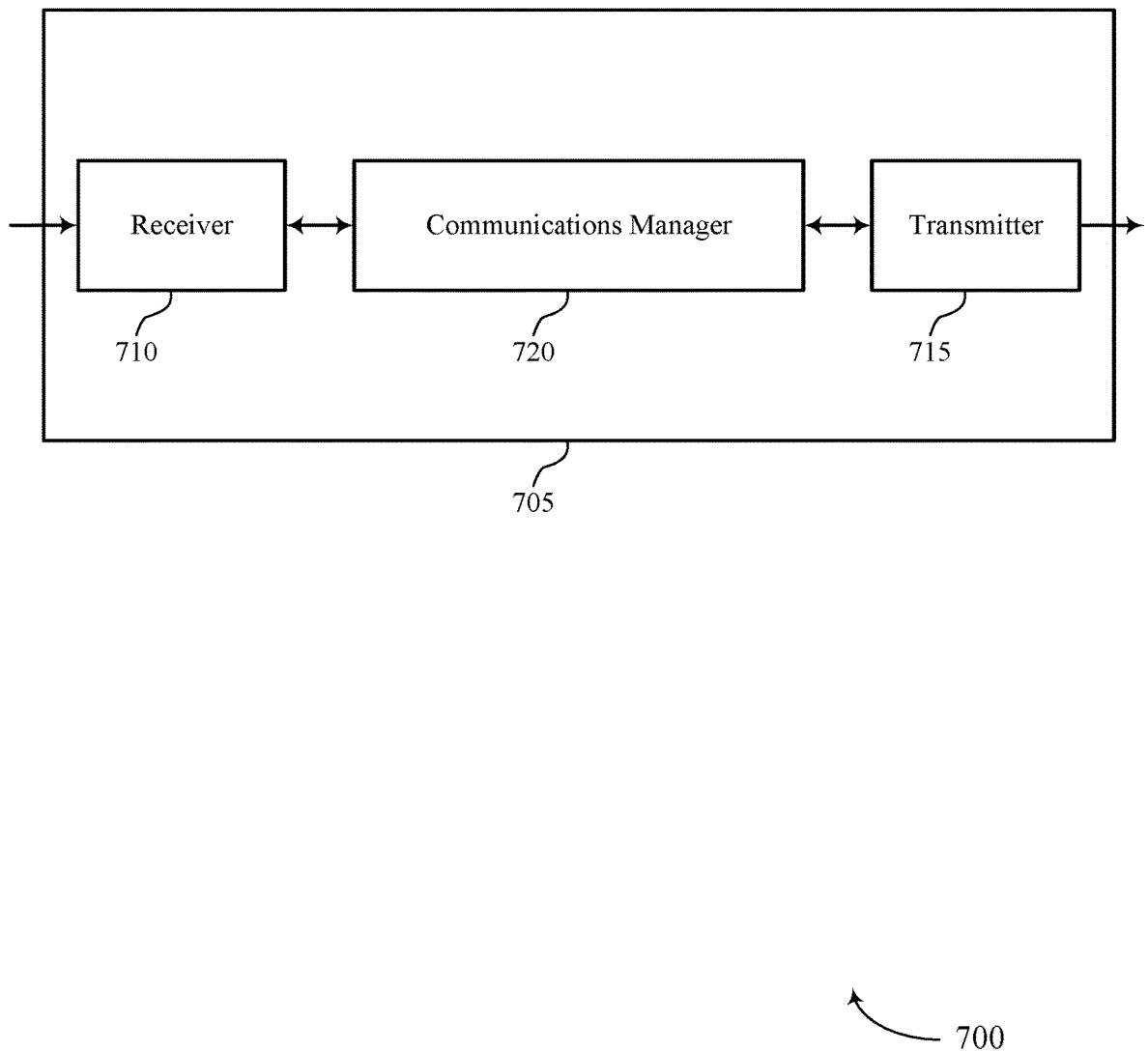
FIGS. 7 and 8 show block diagrams of devices that support RO selection for RedCap UEs in accordance with aspects of the present disclosure.

FIG. 7 shows a block diagram 700 of a device 705 that supports RO selection for RedCap UEs in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to RO selection for RedCap UEs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to RO selection for RedCap UEs). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of RO selection for RedCap UEs as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving system information from a base station indicating a respective mapping of a set of synchronization signal blocks to a set of random-access channel occasions. The communications manager 720 may be configured as or otherwise support a means for receiving one or more synchronization signal blocks of the set of synchronization signal blocks from the base station. The communications manager 720 may be configured as or otherwise support a means for transmitting a random-access preamble to the base station in a random-access channel occasion selected from a subset of the set of random-access channel occasions associated with the one or more synchronization signal blocks, the random-access channel occasion selected from the subset of the set of random-access channel occasions based on a duration between a latest received downlink transmission and the random-access channel occasion satisfying a threshold duration.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, and more efficient utilization of communication resources. In particular, because a half-duplex RedCap UE 115 may efficiently select an RO in which to transmit a RACH preamble, the half-duplex RedCap UE 115 may complete random-access procedures earlier, resulting in power savings and less wasted resources.

Figure 8:
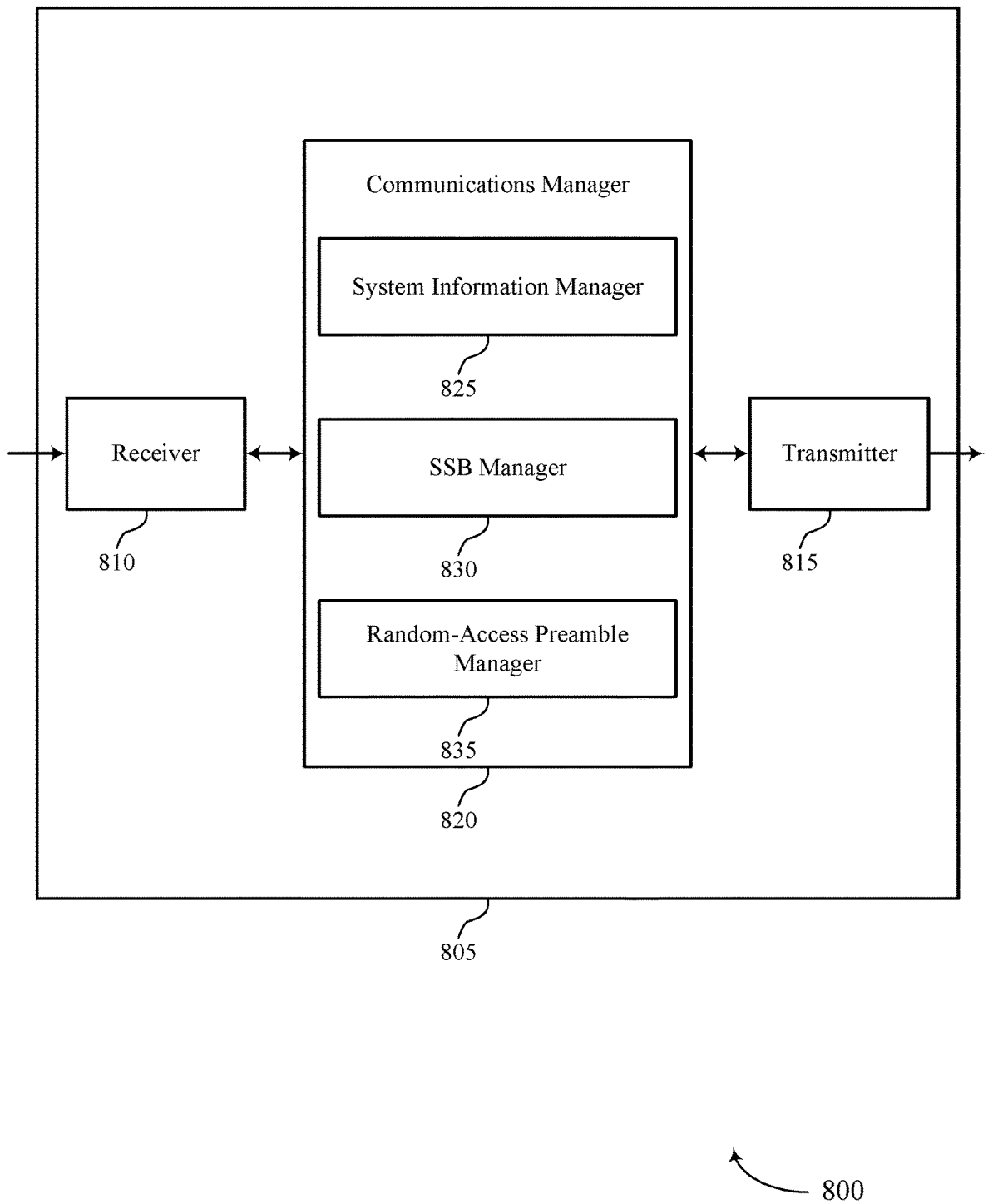

FIG. 8 shows a block diagram 800 of a device 805 that supports RO selection for RedCap UEs in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to RO selection for RedCap UEs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to RO selection for RedCap UEs). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of RO selection for RedCap UEs as described herein. For example, the communications manager 820 may include a system information manager 825, an SSB manager 830, a random-access preamble manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The system information manager 825 may be configured as or otherwise support a means for receiving system information from a base station indicating a respective mapping of a set of synchronization signal blocks to a set of random-access channel occasions. The SSB manager 830 may be configured as or otherwise support a means for receiving one or more synchronization signal blocks of the set of synchronization signal blocks from the base station. The random-access preamble manager 835 may be configured as or otherwise support a means for transmitting a random-access preamble to the base station in a random-access channel occasion selected from a subset of the set of random-access channel occasions associated with the one or more synchronization signal blocks, the random-access channel occasion selected from the subset of the set of random-access channel occasions based on a duration between a latest received downlink transmission and the random-access channel occasion satisfying a threshold duration.

Figure 9:
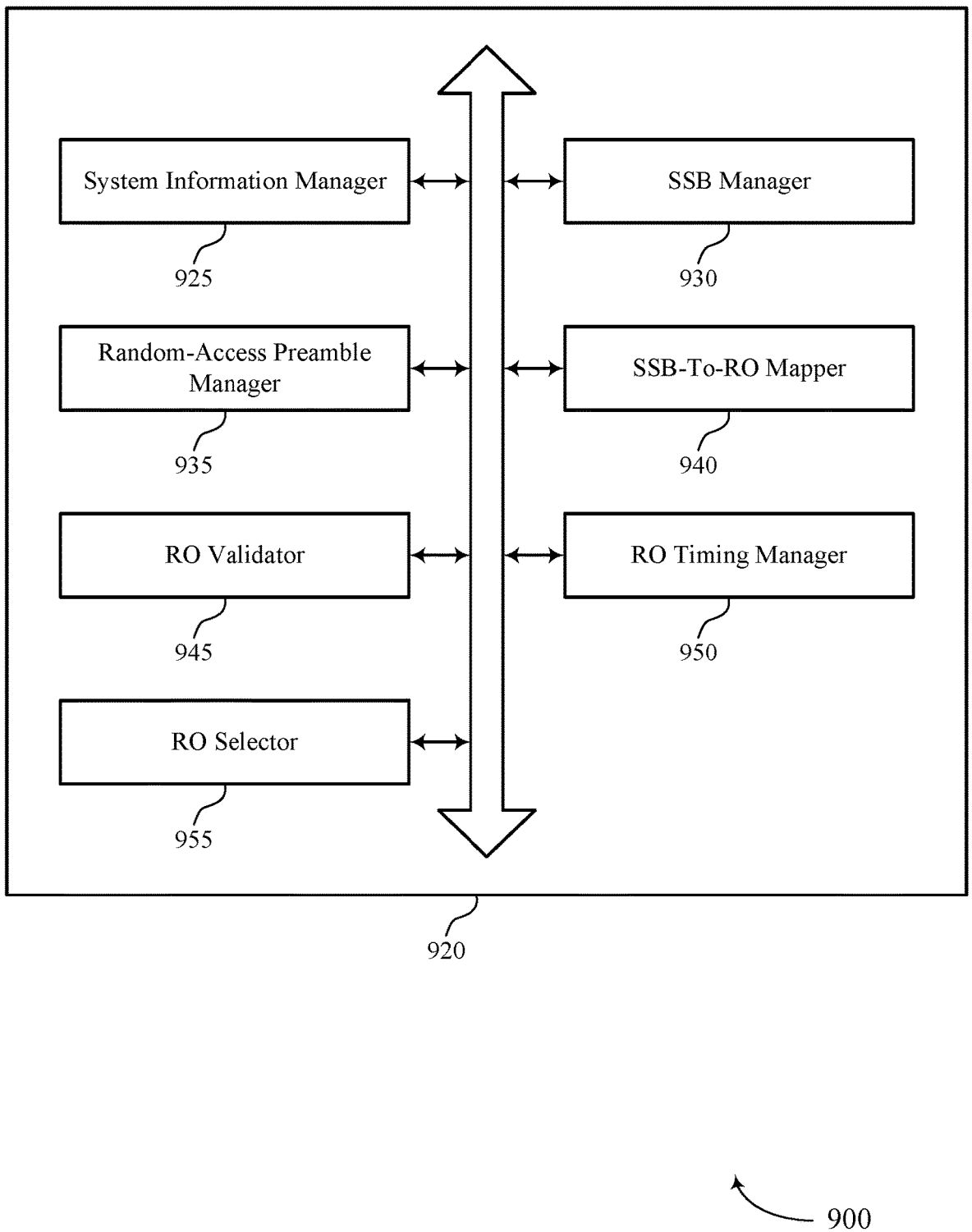
FIG. 9 shows a block diagram of a communications manager that supports RO selection for RedCap UEs in accordance with aspects of the present disclosure.

FIG. 9 shows a block diagram 900 of a communications manager 920 that supports RO selection for RedCap UEs in accordance with aspects of the present disclosure. The communications manager 920 may be an example of aspects of a communications manager 720, a communications manager 820, or both, as described herein. The communications manager 920, or various components thereof, may be an example of means for performing various aspects of RO selection for RedCap UEs as described herein. For example, the communications manager 920 may include a system information manager 925, an SSB manager 930, a random-access preamble manager 935, an SSB-to-RO mapper 940, a RO validator 945, a RO timing manager 950, a RO selector 955, or any combination thereof. Each of these components may communicate, directly or indirectly, with one another (e.g., via one or more buses).

The communications manager 920 may support wireless communication at a UE in accordance with examples as disclosed herein. The system information manager 925 may be configured as or otherwise support a means for receiving system information from a base station indicating a respective mapping of a set of synchronization signal blocks to a set of random-access channel occasions. The SSB manager 930 may be configured as or otherwise support a means for receiving one or more synchronization signal blocks of the set of synchronization signal blocks from the base station. The random-access preamble manager 935 may be configured as or otherwise support a means for transmitting a random-access preamble to the base station in a random-access channel occasion selected from a subset of the set of random-access channel occasions associated with the one or more synchronization signal blocks, the random-access channel occasion selected from the subset of the set of random-access channel occasions based on a duration between a latest received downlink transmission and the random-access channel occasion satisfying a threshold duration.

In some examples, to support receiving the system information, the system information manager 925 may be configured as or otherwise support a means for receiving, in the system information, a set of multiple mappings of the set of synchronization signal blocks to different sets of random-access channel occasions. In some examples, to support receiving the system information, the SSB-to-RO mapper 940 may be configured as or otherwise support a means for identifying the respective mapping of the set of synchronization signal blocks to the set of random-access channel occasions from the set of multiple mappings based on a capability of the UE, where transmitting the random-access preamble in the random-access channel occasion is based on the identifying.

In some examples, the RO validator 945 may be configured as or otherwise support a means for identifying the subset of the set of random-access channel occasions from which to select the random-access channel occasion based on a duration between a latest received synchronization signal block of the one or more synchronization signal blocks and each random-access channel occasion in the subset of the set of random-access channel occasions satisfying the threshold duration.

In some examples, identifying the subset of the set of random-access channel occasions from which to select the random-access channel occasion is further based on excluding random access occasions of the set of random-access channel occasions that precede a synchronization signal block within a slot.

In some examples, the UE is configured to operate in a half-duplex mode. In some examples, the latest received downlink transmission includes a control channel transmission, a data channel transmission, or a reference signal transmission.

In some examples, to support receiving the system information, the system information manager 925 may be configured as or otherwise support a means for receiving, in the system information, an indication of the subset of the set of random-access channel occasions from which to select the random-access channel occasion based on a duration between a latest received synchronization signal block of the one or more synchronization signal blocks and each random-access channel occasion in the subset of the set of random-access channel occasions satisfying the threshold duration.

In some examples, the threshold duration satisfies a minimum time for the UE to transition from a receive mode to a transmit mode.

In some examples, the UE is configured to utilize frequency division duplexing, and the minimum time for the UE to transition from the receive mode to the transmit mode is based on a numerology used for the random-access preamble, a capability of the UE, or both.

In some examples, the UE is configured to utilize time division duplexing, and the minimum time for the UE to transition from the receive mode to the transmit mode is based on a numerology used for the random-access preamble, a capability of the UE, a radio frequency retuning time at the UE, or a combination thereof.

In some examples, the threshold duration is equal to a duration configured at the UE for switching from a receive mode to a transmit mode in a time division duplexing mode.

In some examples, the RO timing manager 950 may be configured as or otherwise support a means for receiving an indication of the threshold duration from the base station based on a capability of the UE, where the random-access channel occasion is selected based on receiving the indication of the threshold duration.

In some examples, the RO selector 955 may be configured as or otherwise support a means for selecting the random-access channel occasion in which to transmit the random-access preamble based on a reference signal received power measurement of a synchronization signal block of the one or more synchronization signal blocks satisfying a threshold.

In some examples, the UE includes a reduced-capability UE.

Figure 10:
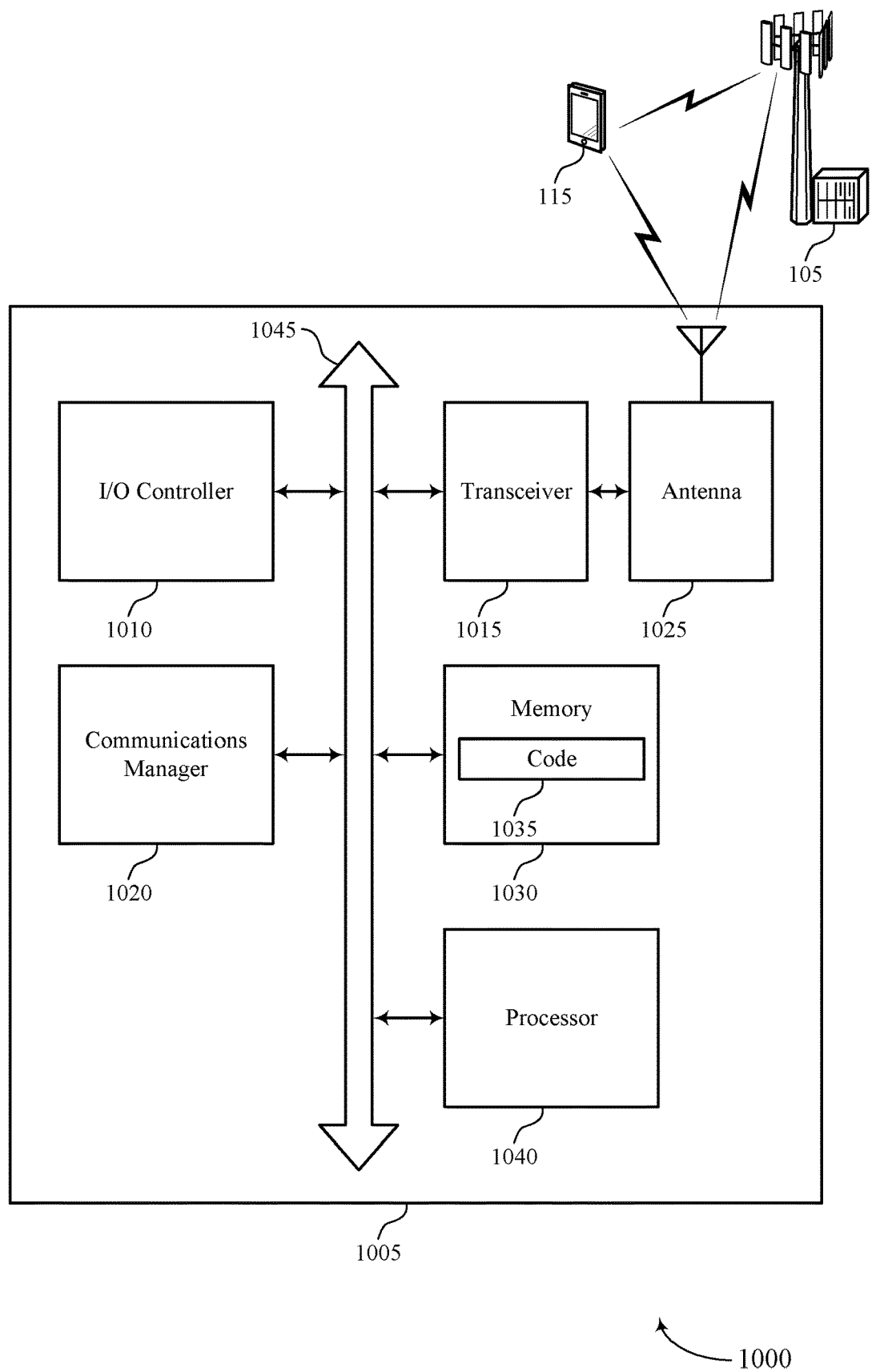
FIG. 10 shows a diagram of a system including a device that supports RO selection for RedCap UEs in accordance with aspects of the present disclosure.

FIG. 10 shows a diagram of a system 1000 including a device 1005 that supports RO selection for RedCap UEs in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting RO selection for RedCap UEs). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving system information from a base station indicating a respective mapping of a set of synchronization signal blocks to a set of random-access channel occasions. The communications manager 1020 may be configured as or otherwise support a means for receiving one or more synchronization signal blocks of the set of synchronization signal blocks from the base station. The communications manager 1020 may be configured as or otherwise support a means for transmitting a random-access preamble to the base station in a random-access channel occasion selected from a subset of the set of random-access channel occasions associated with the one or more synchronization signal blocks, the random-access channel occasion selected from the subset of the set of random-access channel occasions based on a duration between a latest received downlink transmission and the random-access channel occasion satisfying a threshold duration.

By including or configuring the communications manager 1020 in accordance with examples as described herein, the device 1005 may support techniques for reduced processing, reduced power consumption, and more efficient utilization of communication resources. In particular, because a half-duplex RedCap UE 115 may efficiently select an RO in which to transmit a RACH preamble, the half-duplex RedCap UE 115 may complete random-access procedures earlier, resulting in power savings and less wasted resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of RO selection for RedCap UEs as described herein, or the processor 1040 and the memory 1030 may be otherwise configured to perform or support such operations.

Figure 11:
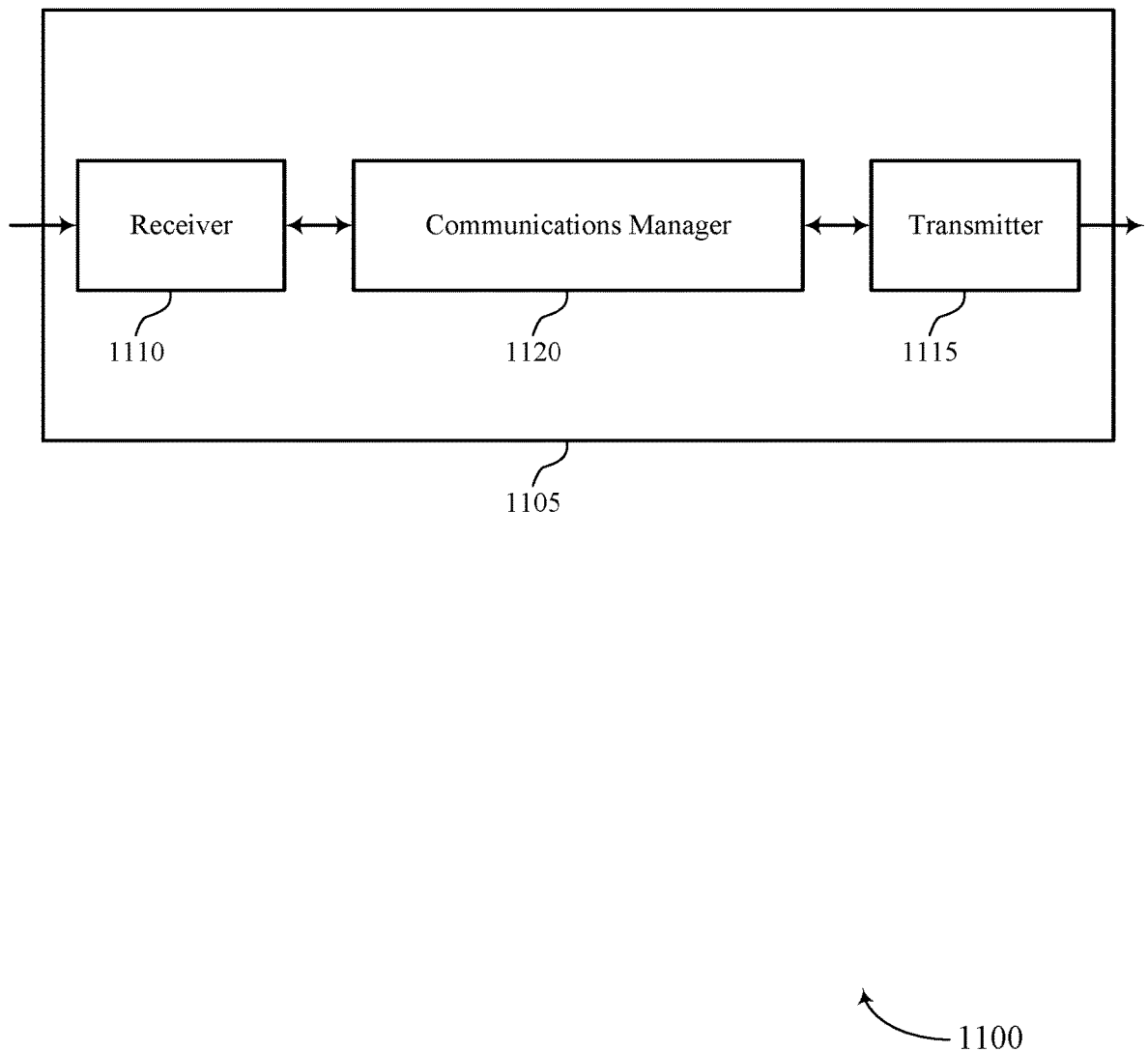
FIGS. 11 and 12 show block diagrams of devices that support RO selection for RedCap UEs in accordance with aspects of the present disclosure.

FIG. 11 shows a block diagram 1100 of a device 1105 that supports RO selection for RedCap UEs in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to RO selection for RedCap UEs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to RO selection for RedCap UEs). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of RO selection for RedCap UEs as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting system information to a set of multiple UEs indicating a first mapping of a set of synchronization signal blocks to a first set of random-access channel occasions and a second mapping of the set of synchronization signal blocks to a second set of random-access channel occasions. The communications manager 1120 may be configured as or otherwise support a means for transmitting the set of synchronization signal blocks. The communications manager 1120 may be configured as or otherwise support a means for receiving, from a UE of the set of multiple UEs in response to transmitting the set of synchronization signal blocks, a random-access preamble in a random-access channel occasion selected from the first set of random-access channel occasions in accordance with the first mapping.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, and more efficient utilization of communication resources. In particular, because a base station 105 may facilitate more efficient random-access procedures at a RedCap UE 115 and allow the RedCap UE 115 to efficiently select an RO in which to transmit a RACH preamble, these random-access procedure may be completed earlier, resulting in power savings at a base station 105 and less wasted resources.

Figure 12:
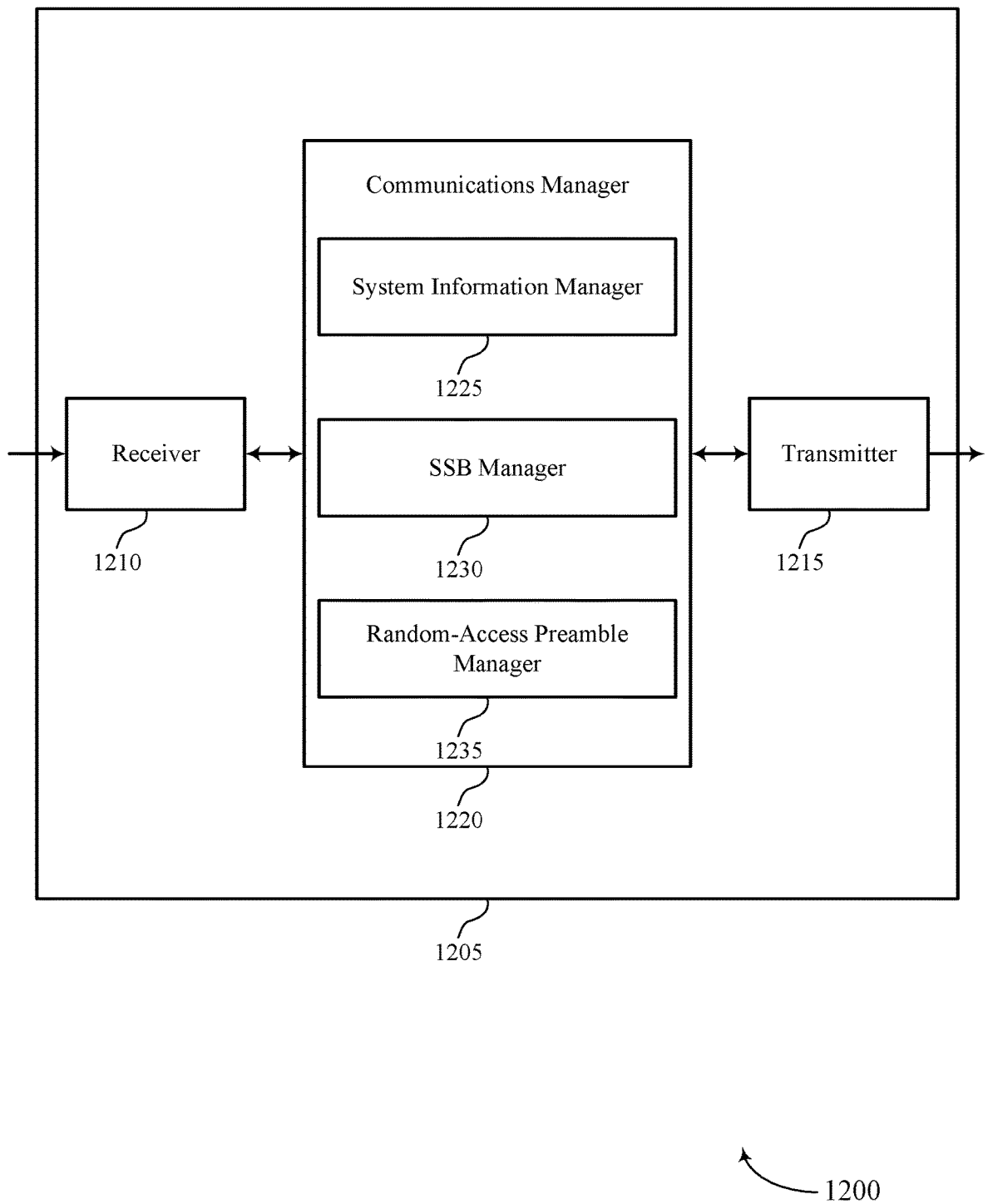

FIG. 12 shows a block diagram 1200 of a device 1205 that supports RO selection for RedCap UEs in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to RO selection for RedCap UEs). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to RO selection for RedCap UEs). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of RO selection for RedCap UEs as described herein. For example, the communications manager 1220 may include a system information manager 1225, an SSB manager 1230, a random-access preamble manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The system information manager 1225 may be configured as or otherwise support a means for transmitting system information to a set of multiple UEs indicating a first mapping of a set of synchronization signal blocks to a first set of random-access channel occasions and a second mapping of the set of synchronization signal blocks to a second set of random-access channel occasions. The SSB manager 1230 may be configured as or otherwise support a means for transmitting the set of synchronization signal blocks. The random-access preamble manager 1235 may be configured as or otherwise support a means for receiving, from a UE of the set of multiple UEs in response to transmitting the set of synchronization signal blocks, a random-access preamble in a random-access channel occasion selected from the first set of random-access channel occasions in accordance with the first mapping.

Figure 13:
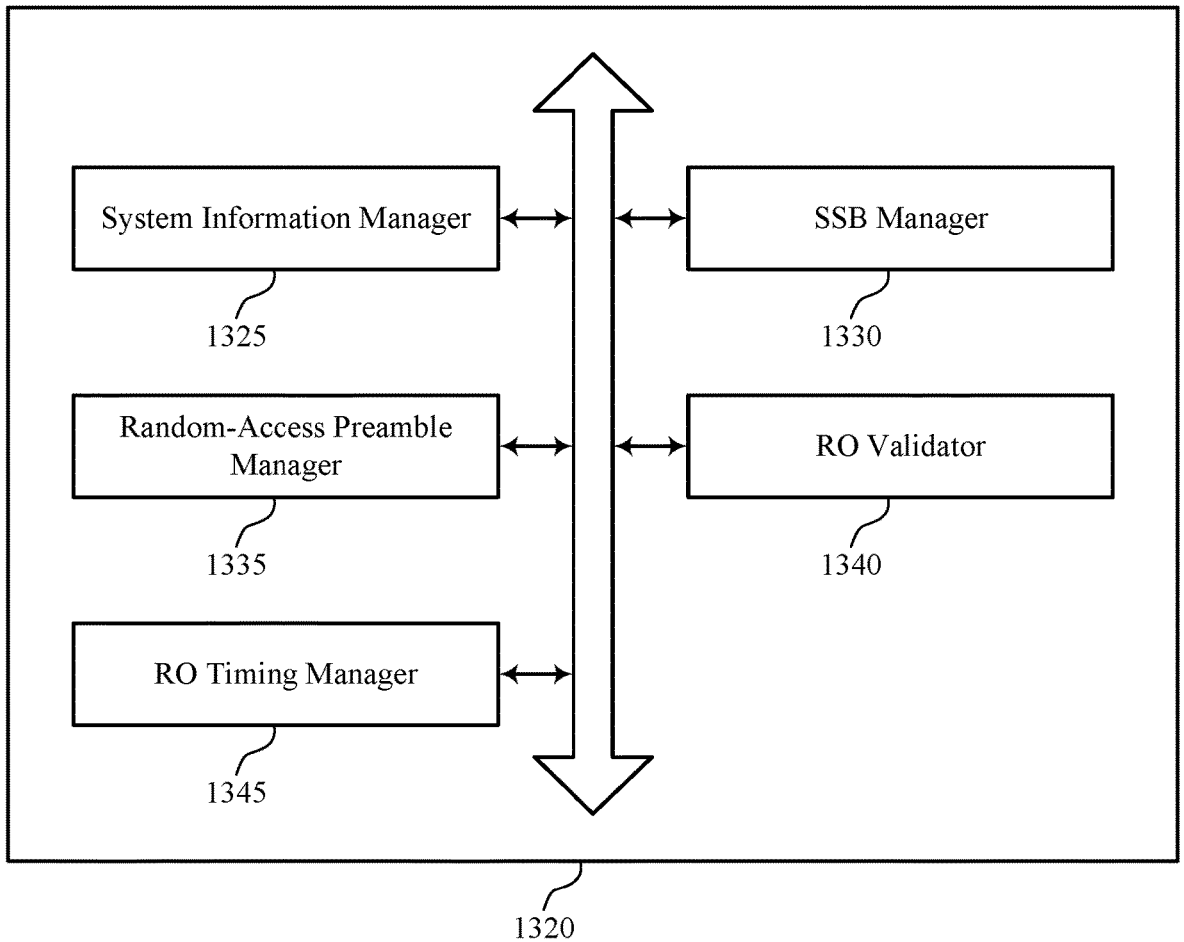
FIG. 13 shows a block diagram of a communications manager that supports RO selection for RedCap UEs in accordance with aspects of the present disclosure.

FIG. 13 shows a block diagram 1300 of a communications manager 1320 that supports RO selection for RedCap UEs in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of RO selection for RedCap UEs as described herein. For example, the communications manager 1320 may include a system information manager 1325, an SSB manager 1330, a random-access preamble manager 1335, a RO validator 1340, a RO timing manager 1345, or any combination thereof. Each of these components may communicate, directly or indirectly, with one another (e.g., via one or more buses).

The communications manager 1320 may support wireless communication at a base station in accordance with examples as disclosed herein. The system information manager 1325 may be configured as or otherwise support a means for transmitting system information to a set of multiple UEs indicating a first mapping of a set of synchronization signal blocks to a first set of random-access channel occasions and a second mapping of the set of synchronization signal blocks to a second set of random-access channel occasions. The SSB manager 1330 may be configured as or otherwise support a means for transmitting the set of synchronization signal blocks. The random-access preamble manager 1335 may be configured as or otherwise support a means for receiving, from a UE of the set of multiple UEs in response to transmitting the set of synchronization signal blocks, a random-access preamble in a random-access channel occasion selected from the first set of random-access channel occasions in accordance with the first mapping.

In some examples, the RO validator 1340 may be configured as or otherwise support a means for identifying the first set of random-access channel occasions from which the UE is to select the random-access channel occasion based on a duration between a latest transmitted synchronization signal block of the set of synchronization signal blocks and each random-access channel occasion in the first set of random-access channel occasions satisfying a threshold duration.

In some examples, the threshold duration satisfies a minimum time for the UE to transition from a receive mode to a transmit mode.

In some examples, the UE is configured to utilize frequency division duplexing, and the minimum time for the UE to transition from the receive mode to the transmit mode is based on a numerology used for the random-access preamble, a capability of the UE, or both.

In some examples, the UE is configured to utilize time division duplexing, and the minimum time for the UE to transition from the receive mode to the transmit mode is based on a numerology used for the random-access preamble, a capability of the UE, a radio frequency retuning time at the UE, or a combination thereof.

In some examples, identifying the first set of random-access channel occasions from which the UE is to select the random-access channel occasion is further based on excluding random access occasions that precede a synchronization signal block within a slot.

In some examples, the threshold duration is equal to a duration configured at the UE for switching from a receive mode to a transmit mode in a time division duplexing mode.

In some examples, the RO timing manager 1345 may be configured as or otherwise support a means for transmitting an indication of the threshold duration to the UE based on a capability of the UE, where receiving the random-access preamble in the random-access channel occasion is based on transmitting the indication of the threshold duration.

In some examples, to support receiving the random-access preamble, the random-access preamble manager 1335 may be configured as or otherwise support a means for receiving the random-access preamble in the random-access channel occasion based on a reference signal received power measurement of a synchronization signal block in the set of synchronization signal blocks satisfying a threshold.

In some examples, the UE includes a reduced-capability UE.

Figure 14:
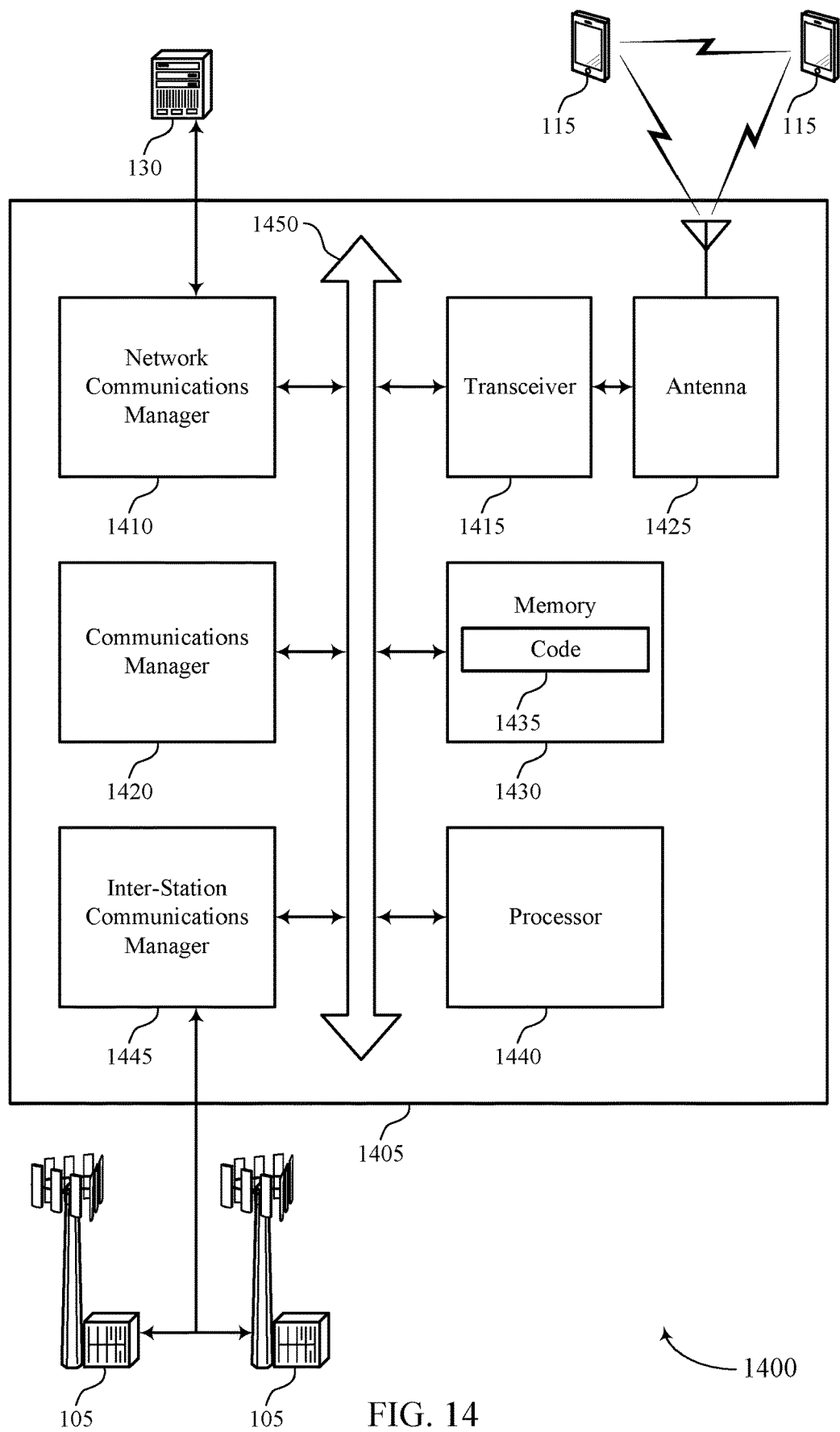
FIG. 14 shows a diagram of a system including a device that supports RO selection for RedCap UEs in accordance with aspects of the present disclosure.

FIG. 14 shows a diagram of a system 1400 including a device 1405 that supports RO selection for RedCap UEs in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting RO selection for RedCap UEs). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting system information to a set of multiple UEs indicating a first mapping of a set of synchronization signal blocks to a first set of random-access channel occasions and a second mapping of the set of synchronization signal blocks to a second set of random-access channel occasions. The communications manager 1420 may be configured as or otherwise support a means for transmitting the set of synchronization signal blocks. The communications manager 1420 may be configured as or otherwise support a means for receiving, from a UE of the set of multiple UEs in response to transmitting the set of synchronization signal blocks, a random-access preamble in a random-access channel occasion selected from the first set of random-access channel occasions in accordance with the first mapping.

By including or configuring the communications manager 1420 in accordance with examples as described herein, the device 1405 may support techniques for reduced processing, reduced power consumption, and more efficient utilization of communication resources. In particular, because a base station 105 may facilitate more efficient random-access procedures at a RedCap UE 115 and allow the RedCap UE 115 to efficiently select an RO in which to transmit a RACH preamble, these random-access procedure may be completed earlier, resulting in power savings at a base station 105 and less wasted resources.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of RO selection for RedCap UEs as described herein, or the processor 1440 and the memory 1430 may be otherwise configured to perform or support such operations.

Figure 15:
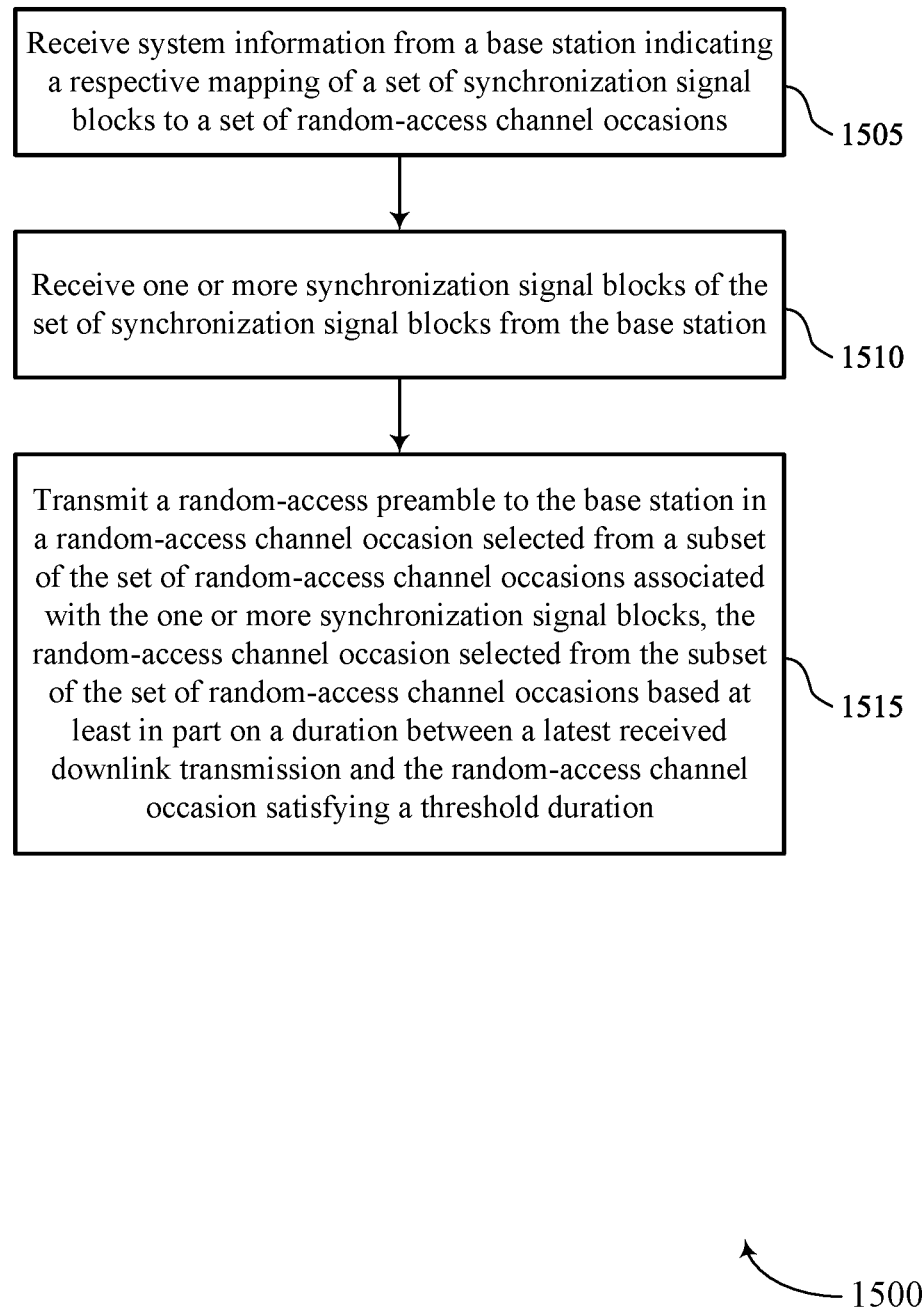
FIGS. 15 and 16 show flowcharts illustrating methods that support RO selection for RedCap UEs in accordance with aspects of the present disclosure.

FIG. 15 shows a flowchart illustrating a method 1500 that supports RO selection for RedCap UEs in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving system information from a base station indicating a respective mapping of a set of synchronization signal blocks to a set of random-access channel occasions. The operations of 1505 may be performed in accordance with examples as disclosed herein. In some examples, aspects of the operations of 1505 may be performed by a system information manager 925 as described with reference to FIG. 9.

At 1510, the method may include receiving one or more synchronization signal blocks of the set of synchronization signal blocks from the base station. The operations of 1510 may be performed in accordance with examples as disclosed herein. In some examples, aspects of the operations of 1510 may be performed by an SSB manager 930 as described with reference to FIG. 9.

At 1515, the method may include transmitting a random-access preamble to the base station in a random-access channel occasion selected from a subset of the set of random-access channel occasions associated with the one or more synchronization signal blocks, the random-access channel occasion selected from the subset of the set of random-access channel occasions based on a duration between a latest received downlink transmission and the random-access channel occasion satisfying a threshold duration. The operations of 1515 may be performed in accordance with examples as disclosed herein. In some examples, aspects of the operations of 1515 may be performed by a random-access preamble manager 935 as described with reference to FIG. 9.

Figure 16:
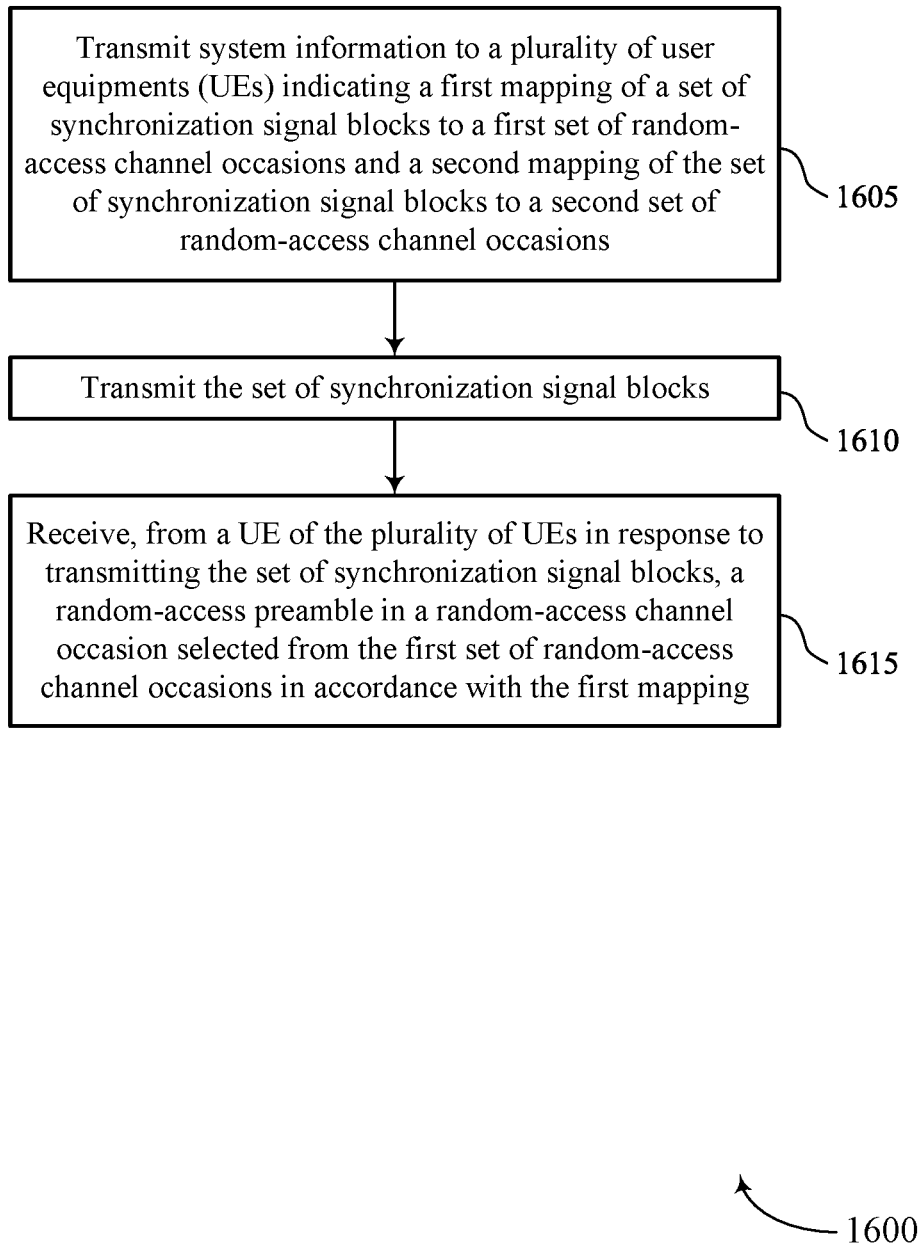

FIG. 16 shows a flowchart illustrating a method 1600 that supports RO selection for RedCap UEs in accordance with aspects of the present disclosure. The operations of the method 1600 may be implemented by a base station or its components as described herein. For example, the operations of the method 1600 may be performed by a base station 105 as described with reference to FIGS. 1 through 6 and 11 through 14. In some examples, a base station may execute a set of instructions to control the functional elements of the base station to perform the described functions. Additionally, or alternatively, the base station may perform aspects of the described functions using special-purpose hardware.

At 1605, the method may include transmitting system information to a set of multiple UEs indicating a first mapping of a set of synchronization signal blocks to a first set of random-access channel occasions and a second mapping of the set of synchronization signal blocks to a second set of random-access channel occasions. The operations of 1605 may be performed in accordance with examples as disclosed herein. In some examples, aspects of the operations of 1605 may be performed by a system information manager 1325 as described with reference to FIG. 13.

At 1610, the method may include transmitting the set of synchronization signal blocks. The operations of 1610 may be performed in accordance with examples as disclosed herein. In some examples, aspects of the operations of 1610 may be performed by an SSB manager 1330 as described with reference to FIG. 13.

At 1615, the method may include receiving, from a UE of the set of multiple UEs in response to transmitting the set of synchronization signal blocks, a random-access preamble in a random-access channel occasion selected from the first set of random-access channel occasions in accordance with the first mapping. The operations of 1615 may be performed in accordance with examples as disclosed herein. In some examples, aspects of the operations of 1615 may be performed by a random-access preamble manager 1335 as described with reference to FIG. 13.

The following provides an overview of aspects of the present disclosure:

Aspect 1: A method for wireless communication at a UE, comprising: receiving system information from a base station indicating a respective mapping of a set of synchronization signal blocks to a set of random-access channel occasions; receiving one or more synchronization signal blocks of the set of synchronization signal blocks from the base station; and transmitting a random-access preamble to the base station in a random-access channel occasion selected from a subset of the set of random-access channel occasions associated with the one or more synchronization signal blocks, the random-access channel occasion selected from the subset of the set of random-access channel occasions based at least in part on a duration between a latest received downlink transmission and the random-access channel occasion satisfying a threshold duration.

Aspect 2: The method of aspect 1, wherein receiving the system information comprises: receiving, in the system information, a plurality of mappings of the set of synchronization signal blocks to different sets of random-access channel occasions; and identifying the respective mapping of the set of synchronization signal blocks to the set of random-access channel occasions from the plurality of mappings based at least in part on a capability of the UE, wherein transmitting the random-access preamble in the random-access channel occasion is based at least in part on the identifying.

Aspect 3: The method of any of aspects 1 through 2, further comprising: identifying the subset of the set of random-access channel occasions from which to select the random-access channel occasion based at least in part on a duration between a latest received synchronization signal block of the one or more synchronization signal blocks and each random-access channel occasion in the subset of the set of random-access channel occasions satisfying the threshold duration.

Aspect 4: The method of aspect 3, wherein identifying the subset of the set of random-access channel occasions from which to select the random-access channel occasion is further based at least in part on excluding random access occasions of the set of random-access channel occasions that precede a synchronization signal block within a slot.

Aspect 5: The method of any of aspects 3 through 4, wherein the UE is configured to operate in a half-duplex mode, and the latest received downlink transmission comprises a control channel transmission, a data channel transmission, or a reference signal transmission.

Aspect 6: The method of any of aspects 1 through 5, wherein receiving the system information comprises: receiving, in the system information, an indication of the subset of the set of random-access channel occasions from which to select the random-access channel occasion based at least in part on a duration between a latest received synchronization signal block of the one or more synchronization signal blocks and each random-access channel occasion in the subset of the set of random-access channel occasions satisfying the threshold duration.

Aspect 7: The method of any of aspects 1 through 6, wherein the threshold duration satisfies a minimum time for the UE to transition from a receive mode to a transmit mode.

Aspect 8: The method of aspect 7, wherein the UE is configured to utilize frequency division duplexing, and the minimum time for the UE to transition from the receive mode to the transmit mode is based at least in part on a numerology used for the random-access preamble, a capability of the UE, or both.

Aspect 9: The method of any of aspects 7 through 8, wherein the UE is configured to utilize time division duplexing, and the minimum time for the UE to transition from the receive mode to the transmit mode is based at least in part on a numerology used for the random-access preamble, a capability of the UE, a radio frequency retuning time at the UE, or a combination thereof.

Aspect 10: The method of any of aspects 1 through 9, wherein the threshold duration is equal to a duration configured at the UE for switching from a receive mode to a transmit mode in a time division duplexing mode.

Aspect 11: The method of any of aspects 1 through 10, further comprising: receiving an indication of the threshold duration from the base station based at least in part on a capability of the UE, wherein the random-access channel occasion is selected based at least in part on receiving the indication of the threshold duration.

Aspect 12: The method of any of aspects 1 through 11, further comprising: selecting the random-access channel occasion in which to transmit the random-access preamble based at least in part on a reference signal received power measurement of a synchronization signal block of the one or more synchronization signal blocks satisfying a threshold.

Aspect 13: The method of any of aspects 1 through 12, wherein the UE comprises a reduced-capability UE.

Aspect 14: A method for wireless communication at a base station, comprising: transmitting system information to a plurality of UEs indicating a first mapping of a set of synchronization signal blocks to a first set of random-access channel occasions and a second mapping of the set of synchronization signal blocks to a second set of random-access channel occasions; transmitting the set of synchronization signal blocks; and receiving, from a UE of the plurality of UEs in response to transmitting the set of synchronization signal blocks, a random-access preamble in a random-access channel occasion selected from the first set of random-access channel occasions in accordance with the first mapping.

Aspect 15: The method of aspect 14, further comprising: identifying the first set of random-access channel occasions from which the UE is to select the random-access channel occasion based at least in part on a duration between a latest transmitted synchronization signal block of the set of synchronization signal blocks and each random-access channel occasion in the first set of random-access channel occasions satisfying a threshold duration.

Aspect 16: The method of aspect 15, wherein the threshold duration satisfies a minimum time for the UE to transition from a receive mode to a transmit mode.

Aspect 17: The method of aspect 16, wherein the UE is configured to utilize frequency division duplexing, and the minimum time for the UE to transition from the receive mode to the transmit mode is based at least in part on a numerology used for the random-access preamble, a capability of the UE, or both.

Aspect 18: The method of any of aspects 16 through 17, wherein the UE is configured to utilize time division duplexing, and the minimum time for the UE to transition from the receive mode to the transmit mode is based at least in part on a numerology used for the random-access preamble, a capability of the UE, a radio frequency retuning time at the UE, or a combination thereof.

Aspect 19: The method of any of aspects 15 through 18, wherein identifying the first set of random-access channel occasions from which the UE is to select the random-access channel occasion is further based at least in part on excluding random access occasions that precede a synchronization signal block within a slot.

Aspect 20: The method of any of aspects 15 through 19, wherein the threshold duration is equal to a duration configured at the UE for switching from a receive mode to a transmit mode in a time division duplexing mode.

Aspect 21: The method of any of aspects 15 through 20, further comprising: transmitting an indication of the threshold duration to the UE based at least in part on a capability of the UE, wherein receiving the random-access preamble in the random-access channel occasion is based at least in part on transmitting the indication of the threshold duration.

Aspect 22: The method of any of aspects 14 through 21, wherein receiving the random-access preamble comprises: receiving the random-access preamble in the random-access channel occasion based at least in part on a reference signal received power measurement of a synchronization signal block in the set of synchronization signal blocks satisfying a threshold.

Aspect 23: The method of any of aspects 14 through 22, wherein the UE comprises a reduced-capability UE.

Aspect 24: An apparatus for wireless communication at a UE, comprising a processor; memory coupled with the processor; and instructions stored in the memory and executable by the processor to cause the apparatus to perform a method of any of aspects 1 through 13.

Aspect 25: An apparatus for wireless communication at a UE, comprising at least one means for performing a method of any of aspects 1 through 13.

Aspect 26: A non-transitory computer-readable medium storing code for wireless communication at a UE, the code comprising instructions executable by a processor to perform a method of any of aspects 1 through 13.

Aspect 27: An apparatus for wireless communication at a base station, comprising a processor; memory coupled with the processor; and instructions stored in the memory and executable by the processor to cause the apparatus to perform a method of any of aspects 14 through 23.

Aspect 28: An apparatus for wireless communication at a base station, comprising at least one means for performing a method of any of aspects 14 through 23.

Aspect 29: A non-transitory computer-readable medium storing code for wireless communication at a base station, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    at least one processor;
    memory coupled with the at least one processor; and
    instructions stored in the memory and executable by the at least one processor to cause the apparatus to:
        receive, in system information, a plurality of mappings of a set of synchronization signal blocks to different sets of random-access channel occasions;
        identify a mapping of the set of synchronization signal blocks to the different sets of random-access channel occasions from the plurality of mappings based at least in part on a capability of the UE;
        receive one or more synchronization signal blocks of the set of synchronization signal blocks;
        receive, in a receive mode of the UE, a downlink transmission, wherein the downlink transmission is one of a control channel transmission, a data channel transmission, a channel state information reference signal, a tracking reference signal, or a positioning reference signal; and
        transmit, in a transmit mode of the UE, a random-access preamble in a random-access channel occasion selected from a subset of the different sets of random-access channel occasions to which the one or more synchronization signal blocks are mapped, wherein the random-access channel occasion is selected from the subset of the different sets of random-access channel occasions based at least in part on a duration between reception of the downlink transmission and the random-access channel occasion satisfying a threshold duration associated with a time for the UE to transition from the receive mode to the transmit mode, wherein the downlink transmission is a latest received downlink transmission before the random-access channel occasion, wherein the time for the UE to transition from the receive mode to the transmit mode is based at least in part on the UE being configured to operate in a half-duplex mode, and wherein the threshold duration satisfies a minimum time for the UE to transition from the receive mode to the transmit mode.

2. The apparatus of claim 1, wherein the instructions are further executable by the at least one processor to cause the apparatus to:
identify the subset of the different sets of random-access channel occasions from which to select the random-access channel occasion based at least in part on a second duration between a latest received synchronization signal block of the one or more synchronization signal blocks and each random-access channel occasion in the subset of the different sets of random-access channel occasions satisfying the threshold duration.

3. The apparatus of claim 2, wherein identifying the subset of the different sets of random-access channel occasions from which to select the random-access channel occasion is further based at least in part on excluding random access occasions of the different sets of random-access channel occasions that precede a synchronization signal block within a slot.

4. The apparatus of claim 1, wherein the instructions to receive the system information are executable by the at least one processor to cause the apparatus to:
receive, in the system information, an indication of the subset of the different sets of random-access channel occasions from which to select the random-access channel occasion based at least in part on a second duration between a latest received synchronization signal block of the one or more synchronization signal blocks and each random-access channel occasion in the subset of the different sets of random-access channel occasions satisfying the threshold duration.

5. The apparatus of claim 1, wherein the UE is configured to utilize frequency division duplexing, and the minimum time for the UE to transition from the receive mode to the transmit mode is based at least in part on a numerology used for the random-access preamble, the capability of the UE, or both.

6. The apparatus of claim 1, wherein the UE is configured to utilize time division duplexing, and the minimum time for the UE to transition from the receive mode to the transmit mode is based at least in part on a numerology used for the random-access preamble, the capability of the UE, a radio frequency retuning time at the UE, or a combination thereof.

7. The apparatus of claim 1, wherein the threshold duration is equal to a second duration configured at the UE for switching from the receive mode to the transmit mode in a time division duplexing mode.

8. The apparatus of claim 1, wherein the instructions are further executable by the at least one processor to cause the apparatus to:
receive an indication of the threshold duration based at least in part on the capability of the UE, wherein the random-access channel occasion is selected based at least in part on receiving the indication of the threshold duration.

9. The apparatus of claim 1, wherein the instructions are further executable by the at least one processor to cause the apparatus to:
select the random-access channel occasion in which to transmit the random-access preamble based at least in part on a reference signal received power measurement of a synchronization signal block of the one or more synchronization signal blocks satisfying a threshold.

10. The apparatus of claim 1, wherein the UE comprises a reduced-capability UE.

11. The apparatus of claim 1, wherein the threshold duration is specified by a look-up table.

12. An apparatus for wireless communication, comprising:
at least one processor;
memory coupled with the at least one processor; and
instructions stored in the memory and executable by the at least one processor to cause the apparatus to:
transmit system information to a plurality of user equipments (UEs), the system information comprising a plurality of mappings including a first mapping of a set of synchronization signal blocks to a first set of random-access channel occasions and a second mapping of the set of synchronization signal blocks to a second set of random-access channel occasions, wherein the first mapping and the second mapping are based at least in part on respective capabilities of the plurality of UEs;
transmit the set of synchronization signal blocks;
transmit, to a UE of the plurality of UEs, a downlink transmission, wherein the downlink transmission is one of a control channel transmission, a data channel transmission, a channel state information reference signal, a tracking reference signal, or a positioning reference signal; and
receive, from the UE in response to transmitting the set of synchronization signal blocks, a random-access preamble in a random-access channel occasion selected from the first set of random-access channel occasions in accordance with the first mapping and based at least in part on a duration between transmission of the downlink transmission and the random-access channel occasion satisfying a threshold duration associated with a time for the UE to transition from a receive mode to a transmit mode, wherein the downlink transmission is a latest received downlink transmission at the UE before the random-access channel occasion, wherein the first set of random-access channel occasions is identified based at least in part on a second duration between a latest transmitted synchronization signal block of the set of synchronization signal blocks and each random-access channel occasion in the first set of random-access channel occasions satisfying the threshold duration, wherein the time for the UE to transition from the receive mode to the transmit mode is based at least in part on the UE being configured to operate in a half-duplex mode, and wherein the threshold duration satisfies a minimum time for the UE to transition from the receive mode to the transmit mode.

13. The apparatus of claim 12, wherein the UE is configured to utilize frequency division duplexing, and the minimum time for the UE to transition from the receive mode to the transmit mode is based at least in part on a numerology used for the random-access preamble, a capability of the UE, or both.

14. The apparatus of claim 12, wherein the UE is configured to utilize time division duplexing, and the minimum time for the UE to transition from the receive mode to the transmit mode is based at least in part on a numerology used for the random-access preamble, a capability of the UE, a radio frequency retuning time at the UE, or a combination thereof.

15. The apparatus of claim 12, wherein the first set of random-access channel occasions from which the UE is to select the random-access channel occasion is further identified based at least in part on excluding random access occasions that precede a synchronization signal block within a slot.

16. The apparatus of claim 12, wherein the threshold duration is equal to a third duration configured at the UE for switching from the receive mode to the transmit mode in a time division duplexing mode.

17. The apparatus of claim 12, wherein the instructions are further executable by the at least one processor to cause the apparatus to:
transmit an indication of the threshold duration to the UE based at least in part on a capability of the UE, wherein receiving the random-access preamble in the random-access channel occasion is based at least in part on transmitting the indication of the threshold duration.

18. The apparatus of claim 12, wherein the instructions to receive the random-access preamble are executable by the at least one processor to cause the apparatus to:
receive the random-access preamble in the random-access channel occasion based at least in part on a reference signal received power measurement of a synchronization signal block in the set of synchronization signal blocks satisfying a threshold.

19. The apparatus of claim 12, wherein the UE comprises a reduced-capability UE.

20. A method for wireless communication at a user equipment (UE), comprising:
receiving, in system information, a plurality of mappings of a set of synchronization signal blocks to different sets of random-access channel occasions;
identifying a mapping of the set of synchronization signal blocks to the different sets of random-access channel occasions from the plurality of mappings based at least in part on a capability of the UE;
receiving one or more synchronization signal blocks of the set of synchronization signal blocks;
receiving, in a receive mode of the UE, a downlink transmission, wherein the downlink transmission is one of a control channel transmission, a data channel transmission, a channel state information reference signal, a tracking reference signal, or a positioning reference signal; and
transmitting, in a transmit mode of the UE, a random-access preamble in a random-access channel occasion selected from a subset of the different sets of random-access channel occasions to which the one or more synchronization signal blocks are mapped, wherein the random-access channel occasion is selected from the subset of the different sets of random-access channel occasions based at least in part on a duration between reception of the downlink transmission and the random-access channel occasion satisfying a threshold duration associated with a time for the UE to transition from the receive mode to the transmit mode, wherein the downlink transmission is a latest received downlink transmission before the random-access channel occasion, wherein the time for the UE to transition from the receive mode to the transmit mode is based at least in part on the UE being configured to operate in a half-duplex mode, and wherein the threshold duration satisfies a minimum time for the UE to transition from the receive mode to the transmit mode.

21. The method of claim 20, further comprising:
identifying the subset of the different sets of random-access channel occasions from which to select the random-access channel occasion based at least in part on a second duration between a latest received synchronization signal block of the one or more synchronization signal blocks and each random-access channel occasion in the subset of the different sets of random-access channel occasions satisfying the threshold duration.

22. The method of claim 21, wherein identifying the subset of the different sets of random-access channel occasions from which to select the random-access channel occasion is further based at least in part on excluding random access occasions of the different sets of random-access channel occasions that precede a synchronization signal block within a slot.

23. The method of claim 20, wherein receiving the system information comprises:
receiving, in the system information, an indication of the subset of the different sets of random-access channel occasions from which to select the random-access channel occasion based at least in part on a second duration between a latest received synchronization signal block of the one or more synchronization signal blocks and each random-access channel occasion in the subset of the different sets of random-access channel occasions satisfying the threshold duration.

24. The method of claim 20, wherein the UE is configured to utilize time division duplexing, and the minimum time for the UE to transition from the receive mode to the transmit mode is based at least in part on a numerology used for the random-access preamble, the capability of the UE, a radio frequency retuning time at the UE, or a combination thereof.

25. The method of claim 20, further comprising:
receiving an indication of the threshold duration based at least in part on the capability of the UE, wherein the random-access channel occasion is selected based at least in part on receiving the indication of the threshold duration.

26. The method of claim 20, further comprising:
selecting the random-access channel occasion in which to transmit the random-access preamble based at least in part on a reference signal received power measurement of a synchronization signal block of the one or more synchronization signal blocks satisfying a threshold.

27. A method for wireless communication, comprising:
transmitting system information to a plurality of user equipments (UEs), the system information comprising a plurality of mappings including a first mapping of a set of synchronization signal blocks to a first set of random-access channel occasions and a second mapping of the set of synchronization signal blocks to a second set of random-access channel occasions, wherein the first mapping and the second mapping are based at least in part on respective capabilities of the plurality of UEs;
transmitting the set of synchronization signal blocks;
transmitting, to a UE of the plurality of UEs, a downlink transmission, wherein the downlink transmission is one of a control channel transmission, a data channel transmission, a channel state information reference signal, a tracking reference signal, or a positioning reference signal; and
receiving, from the UE in response to transmitting the set of synchronization signal blocks, a random-access preamble in a random-access channel occasion selected from the first set of random-access channel occasions in accordance with the first mapping and based at least in part on a duration between transmission of the downlink transmission and the random-access channel occasion satisfying a threshold duration associated with a time for the UE to transition from a receive mode to a transmit mode, wherein the downlink transmission is a latest received downlink transmission at the UE before the random-access channel occasion, wherein the first set of random-access channel occasions is identified based at least in part on a second duration between a latest transmitted synchronization signal block of the set of synchronization signal blocks and each random-access channel occasion in the first set of random-access channel occasions satisfying the threshold duration, wherein the time for the UE to transition from the receive mode to the transmit mode is based at least in part on the UE being configured to operate in a half-duplex mode, and wherein the threshold duration satisfies a minimum time for the UE to transition from the receive mode to the transmit mode.

28. The method of claim 27, wherein the UE is configured to utilize frequency division duplexing, and the minimum time for the UE to transition from the receive mode to the transmit mode is based at least in part on a numerology used for the random-access preamble, a respective capability of the UE, or both.

\* \* \* \* \*